US009713849B2

(12) United States Patent
Behr

(10) Patent No.: US 9,713,849 B2
(45) Date of Patent: *Jul. 25, 2017

(54) MULTIFUNCTIONAL SAW APPARATUS AND METHOD

(71) Applicant: RBWL Licensing Holdings, LLC, Edina, MN (US)

(72) Inventor: Robert Burton Behr, Minneapolis, MN (US)

(73) Assignee: RBWL Licensing Holdings, LLC, Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,399

(22) Filed: Apr. 22, 2015

(65) Prior Publication Data
US 2015/0224587 A1 Aug. 13, 2015

Related U.S. Application Data

(63) Continuation of application No. 13/965,507, filed on Aug. 13, 2013, now Pat. No. 9,032,852, which is a
(Continued)

(51) Int. Cl.
*B27B 5/00* (2006.01)
*B23D 45/04* (2006.01)
(Continued)

(52) U.S. Cl.
CPC ............ *B23D 47/08* (2013.01); *B23D 45/042* (2013.01); *B23D 59/007* (2013.01); *B27B 5/206* (2013.01);
(Continued)

(58) Field of Classification Search
CPC .... B23D 45/042; B23D 47/08; B23D 59/007; B27B 5/206; B27B 9/00; B27B 9/04;
(Continued)

(56) References Cited

U.S. PATENT DOCUMENTS 1,836,457 A  12/1931  Emmons
2,306,512 A  12/1942  Whitney
(Continued)

FOREIGN PATENT DOCUMENTS

CN  101817187 A  9/2010
EP  1930139 A1  6/2008
(Continued)

OTHER PUBLICATIONS

"U.S. Appl. No. 13/646,973, Notice of Allowance mailed Jul. 17, 2013", 11 pgs.
(Continued)

*Primary Examiner* — Stephen Choi
(74) *Attorney, Agent, or Firm* — Schwegman, Lundberg & Woessner, P.A.

(57) ABSTRACT

In some examples, an apparatus includes a base including an arm selectively movable with respect to the base. The arm is selectively rotatable about a first arm axis. A base plate is engaged with the arm. A tool is configured to be detachably coupled to the base plate. The tool is movable with the base plate when coupled to the base plate. The apparatus includes a first mode with the tool coupled to the base plate and the arm being selectively rotatable about the first arm axis, a second mode with the tool coupled to the base plate and the arm being constrained from rotating about the first arm axis, the arm being substantially stationary with respect to the base; and a third mode with the tool detached from the base plate.

15 Claims, 23 Drawing Sheets

Related U.S. Application Data continuation of application No. 13/646,973, filed on Oct. 8, 2012, now Pat. No. 8,539,870.

(60) Provisional application No. 61/627,607, filed on Oct. 15, 2011.

(51) Int. Cl.
    | | |
    |---|---|
    | *B27B 5/20* | (2006.01) |
    | *B27B 9/00* | (2006.01) |
    | *B27B 9/04* | (2006.01) |
    | *B23D 47/08* | (2006.01) |
    | *B23D 59/00* | (2006.01) |

(52) U.S. Cl.
CPC .................. *B27B 9/00* (2013.01); *B27B 9/04* (2013.01); *Y10T 29/49817* (2015.01); *Y10T 83/7693* (2015.04); *Y10T 83/7697* (2015.04); *Y10T 83/7788* (2015.04); *Y10T 83/8763* (2015.04); *Y10T 83/8773* (2015.04)

(58) Field of Classification Search
CPC ............. Y10T 83/7693; Y10T 83/7697; Y10T 83/7788; Y10T 83/8763; Y10T 83/8773
See application file for complete search history.

(56) References Cited

U.S. PATENT DOCUMENTS

| | | | |
|---|---|---|---|
| 2,851,068 | A | 9/1958 | Goodlet |
| 3,454,055 | A | 7/1969 | Schnettler |
| 3,483,901 | A | 12/1969 | Ray |
| 3,570,564 | A | 3/1971 | Bergler |
| 4,079,648 | A | 3/1978 | Chappell |
| 4,109,901 | A | 8/1978 | Akin |
| 4,328,728 | A | 5/1982 | Ferdinand et al. |
| D266,901 | S | 11/1982 | Ferdinand et al. |
| 4,465,114 | A | 8/1984 | Schumacher |
| 4,531,441 | A | 7/1985 | Bergler |
| 4,587,875 | A | 5/1986 | Deley |
| 4,751,865 | A | 6/1988 | Buckalew |
| 4,840,097 | A | 6/1989 | Campbell |
| 5,189,937 | A | 3/1993 | Garuglieri |
| 5,564,323 | A | 10/1996 | Sasaki et al. |
| 5,570,641 | A | 11/1996 | Garuglieri |
| 5,787,779 | A | 8/1998 | Garuglieri |
| 5,797,307 | A | 8/1998 | Horton |
| 7,077,179 | B1 | 7/2006 | Camiano et al. |
| 7,891,277 | B2 | 2/2011 | Ouellette |
| 8,539,870 | B2 | 9/2013 | Behr |
| 2004/0069109 | A1 | 4/2004 | Sprague |
| 2006/0236834 | A1 | 10/2006 | Ange |
| 2008/0210072 | A1 | 9/2008 | Chang et al. |
| 2010/0011929 | A1 | 1/2010 | Iannell, Sr. |
| 2010/0269660 | A1 | 10/2010 | Janson |
| 2011/0067542 | A1* | 3/2011 | Lacy .................. B23D 45/044 83/471.3 |
| 2013/0092001 | A1 | 4/2013 | Behr |
| 2013/0327197 | A1 | 12/2013 | Behr |

FOREIGN PATENT DOCUMENTS

| | | |
|---|---|---|
| GB | 2028226 A | 3/1980 |
| WO | WO-2013055625 A2 | 4/2013 |
| WO | WO-2013055625 A3 | 4/2013 |

OTHER PUBLICATIONS

"U.S. Appl. No. 13/646,973, Notice of Allowance mailed Aug. 22, 2013", 7 pgs.

"U.S. Appl. No. 13/646,973, Pre-Interview First Office Action mailed Feb. 15, 2013", 7 pgs.

"U.S. Appl. No. 13/646,973, Pre-Interview First Office Action mailed Apr. 2, 2013", 4 pgs.

"U.S. Appl. No. 13/965,507, Non Final Office Action mailed Sep. 10, 2014", 10 pgs.

"U.S. Appl. No. 13/965,507, Notice of Allowance mailed Jan. 20, 2015", 7 pgs.

"U.S. Appl. No. 13/965,507, Response filed Dec. 2, 2014 to Non Final Office Action mailed Sep. 10, 2014", 7 pgs.

"Dewalt DW743N 250mm Combination Flip Over Saw—You Tube", [online]. {retrieved Apr. 23, 2012]. Retrieved from the Internet: <URL: http://www.youtube.com/watch?v=OOYtY2P-bIY>, (2012), 2 pgs.

"International Application Serial No. PCT/US2012/059235, International Preliminary Report on Patentability mailed Feb. 27, 2014", 19 pgs.

"International Application Serial No. PCT/US2012/059235, International Search Report mailed Mar. 13, 2013", 3 pgs.

"International Application Serial No. PCT/US2012/059235, Written Opinion mailed Mar. 13, 2013", 6 pgs.

"Makita LF1000 10in/260mm Flipover Saw—You Tube", [online]. [retrieved Apr. 23, 2012]. Retrieved from the Internet: <URL: http://www.youtube.com/watch?v=VxwyKSGsmtQ &feature=endscreen&NR=1>, (2012), 2 pgs.

U.S. Appl. No. 61/627,607, filed Oct. 15, 2011, Multifunctional Saw Apparatus and Method.

U.S. Appl. No. 13/646,973, filed Oct. 8, 2012, Multifunctional Saw Apparatus and Method.

U.S. Appl. No. 13/965,507, filed Aug. 13, 2013, Multifunctional Saw Apparatus and Method.

\* cited by examiner

MULTIFUNCTIONAL SAW APPARATUS AND METHOD

RELATED APPLICATIONS

This continuation application claims the benefit of U.S. application Ser. No. 13/965,507, filed on Aug. 13, 2013, which is a continuation U.S. application Ser. No. 13/646,973, filed on Oct. 8, 2012, which claims the benefit of U.S. Provisional Application Ser. No. 61/627,607, filed Oct. 15, 2011, and which are hereby incorporated herein by reference in their entirety.

BACKGROUND

The present patent application relates to a tool apparatus, and, more particularly, to a multifunctional saw apparatus and method.

Tools are a staple for the household handyman and the contractor alike. Power tools, in particular, are popular, due to their ability to make a given task easier to accomplish than using an unpowered hand tool, whether it be drilling a hole, tightening a screw, sawing a piece of wood, or the like. One of the most common power tools is the power saw, which comes in various sizes and types, including a radial saw, a miter saw, a table saw, and a circular saw, to name a few. The radial arm saw is typically used for crosscuts and rips of material. The miter saw is typically used for miter cuts, compound miter cuts, and crosscuts of material. The table saw is typically used for rips of material. And, the circular saw is typically used for free-cuts of material. Radial arm saws, miter saws, and table saws are typically larger saws intended for stationary use on a workbench, table top, or stand, whereas circular saws are typically smaller, hand-held devices.

OVERVIEW

This overview is intended to provide an overview of subject matter of the present patent application. It is not intended to provide an exclusive or exhaustive explanation of the invention. The detailed description is included to provide further information about the present patent application.

The present inventor has recognized, among other things, that a tool apparatus (and method therefor) that is capable of functioning in various modes is advantageous for various reasons. For instance, a tool apparatus that is capable of functioning in various modes can be used in place of multiple tools, thereby potentially saving the expense of buying multiple tools and also providing for potential space savings, in that one need only store and/or transport the multifunctional tool apparatus rather than the multiple tools for which the multifunctional tool apparatus is capable of functioning. To better illustrate the apparatus and method disclosed herein, a non-limiting list of examples is provided here:

Example 1 can include subject matter that can include an apparatus comprising a base including an arm selectively movable with respect to the base, the arm being selectively rotatable about a first arm axis. A base plate is engaged with the arm. A tool is configured to be detachably coupled to the base plate, the tool being movable with the base plate when coupled to the base plate. The apparatus includes a first mode with the tool coupled to the base plate and the arm being selectively rotatable about the first arm axis, a second mode with the tool coupled to the base plate and the arm being constrained from rotating about the first arm axis, the arm being substantially stationary with respect to the base, and a third mode with the tool detached from the base plate.

In Example 2, the subject matter of Example 1 is optionally configured such that the base plate is pivotably engaged with the arm, the base plate being pivotable with respect to the arm between a first position and a second position.

In Example 3, the subject matter of Example 2 is optionally configured such that the first mode includes the base plate in the first position and the second mode includes the base plate in the second position.

In Example 4, the subject matter of Example 3 is optionally configured such that the first position of the base plate is rotated substantially ninety degrees from the second position of the base plate.

In Example 5, the subject matter of any one of Examples 1-4 is optionally configured such that the base plate includes a clamp configured to couple the tool to the base plate.

In Example 6, the subject matter of any one of Examples 1-5 is optionally configured such that the tool includes a power tool.

In Example 7, the subject matter of Example 6 is optionally configured such that the tool includes a circular saw.

In Example 8, the subject matter of any one of Examples 1-7 is optionally configured such that the first mode includes a miter saw mode.

In Example 9, the subject matter of any one of Examples 1-8 is optionally configured such that the second mode includes a table saw mode.

In Example 10, the subject matter of any one of Examples 1-9 is optionally configured such that the third mode includes a circular saw mode.

In Example 11, the subject matter of any one of Examples 1-10 is optionally configured such that the base includes a recess configured to allow a portion of a blade of the tool to be recessed below a top surface of the base.

In Example 12, the subject matter of any one of Examples 1-11 is optionally configured such that the base plate includes an engagement feature, the tool including a complementary engagement feature configured to interact with the engagement feature of the base plate to inhibit rotation of the tool with respect to the base plate.

In Example 13, the subject matter of any one of Examples 1-12 optionally comprises a constant-on switch operable with the tool coupled to the base plate and inoperable with the tool detached from the base plate.

In Example 14, the subject matter of any one of Examples 1-13 optionally comprises a blade guard lock configured to inhibit a blade guard of the tool from covering a blade of the tool with the tool coupled to the base plate.

Example 15 can include, or can optionally be combined with any one of Examples 1-14 to include subject matter that can include an apparatus comprising a base including an arm selectively movable with respect to the base, the arm being selectively rotatable about a first arm axis. A base plate is pivotably engaged with the arm. The base plate is pivotable with respect to the arm between a first position and a second position. A circular saw is configured to be detachably coupled to the base plate, the circular saw being movable with the base plate when coupled to the base plate. The apparatus includes a miter saw mode with the circular saw coupled to the base plate in the first position and the arm being selectively rotatable about the first arm axis; a table saw mode with the circular saw coupled to the base plate in the second position and the arm being constrained from rotating about the first arm axis, the arm being substantially stationary with respect to the base; and a circular saw mode with the circular saw detached from the base plate.

In Example 16, the subject matter of Example 15 is optionally configured such that the base includes a recess configured to allow a portion of a blade of the circular saw to be recessed below a top surface of the base.

In Example 17, the subject matter of any one of Examples 15-16 optionally comprises a constant-on switch operable with the circular saw coupled to the base plate and inoperable with the circular saw detached from the base plate.

Example 18 can include, or can optionally be combined with any one of Examples 1-17 to include subject matter that can include a method of making a multifunctional saw apparatus. The method comprises movably attaching an arm to a base, the arm being selectively rotatable about a first arm axis. A base plate is pivotably engaging with the arm, the base plate being pivotable with respect to the arm between a first position and a second position. A circular saw is detachably coupled to the base plate, the circular saw being movable with the base plate when coupled to the base plate. The multifunctional saw apparatus includes a miter saw mode with the circular saw coupled to the base plate in the first position and the arm being selectively rotatable about the first arm axis; a table saw mode with the circular saw coupled to the base plate in the second position and the arm being constrained from rotating about the first arm axis, the arm being substantially stationary with respect to the base; and a circular saw mode with the circular saw detached from the base plate.

In Example 19, the subject matter of Example 18 optionally comprises forming a recess in the base to allow a portion of a blade of the circular saw to be recessed below a top surface of the base.

In Example 20, the subject matter of any one of Examples 18-19 optionally comprises attaching a constant-on switch to the circular saw, the constant-on switch being operable with the circular saw coupled to the base plate and inoperable with the circular saw detached from the base plate.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present patent application relates to tool apparatuses and methods for such tool apparatuses. In various examples, the tool apparatus includes more than one mode of use to allow for the tool apparatus to be used in different situations or to accomplish different tasks using the tool apparatus. It is believed that, in this way, the tool apparatus can effectively take the place of two or more separate tools. In some examples, the tool apparatus is to be used with a power tool. For instance, in various examples, the tool apparatus can be used with a circular saw, a drill, a reciprocating saw, a grinder, a screw gun, a sander, a router, a jig saw, or the like. While the description herein describes various examples of such apparatuses and methods in the context of saw devices, it should be understood that the present subject matter is not so limited and is applicable to other types of tools in addition to saw devices.

Figure 1:
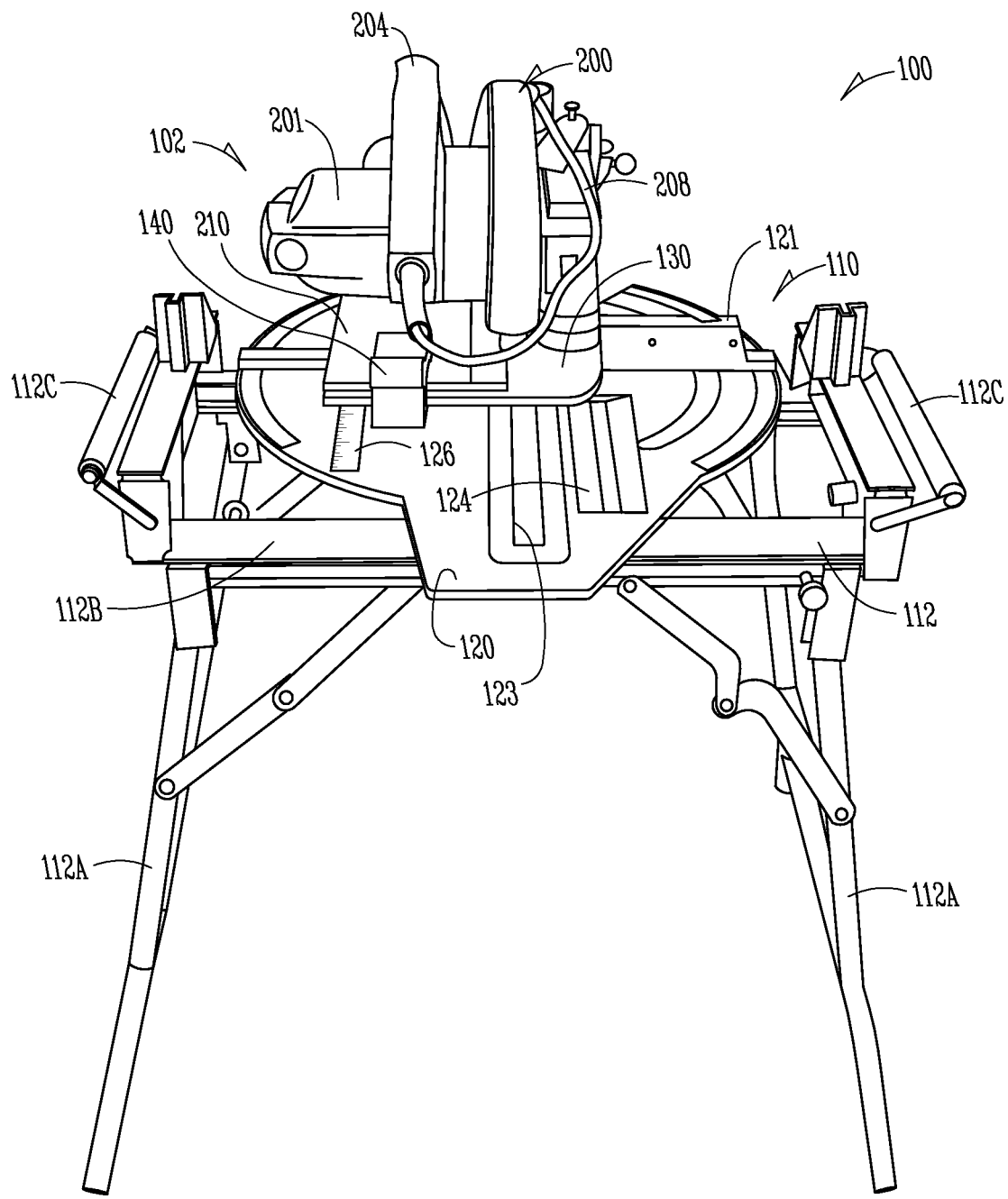
FIG. 1 is a back perspective view of a tool apparatus in accordance with at least one embodiment of the invention, the tool apparatus being in a first mode.

Referring to FIG. 1, an example tool apparatus 100 is shown. In various examples, the tool apparatus 100 includes a tool 200 detachably coupled to a base 110. The base 110, in some examples, can include a table or bed 120 configured to provide a suitable surface on which to perform an operation on a workpiece with the tool 200. That is, the table 120 can provide, in various examples, a surface that is at least one of relatively rigid, substantially planar, sufficiently sized, or sufficiently shaped to support a workpiece while performing an operation on the workpiece with the tool 200.

In some examples, the table 120 can be coupled to a stand 112. The table 120 can be attached to the stand 112 (for instance, using fasteners, interlocking structures, or the like) or can rest on the stand 112. In some examples, the stand 112 is selectively collapsible so as to take up less space than when in an open or expanded configuration, as when it is in use to support the table 120. For instance, the stand 112 can be collapsible for ease in moving or storing the stand 112. In some examples, the stand 112 includes collapsible legs 112A that are configured to fold against a top 112B of the stand 112. In some examples, the stand 112 includes one or more rollers 112C to facilitate the placement and/or movement of a workpiece (such as, for instance, a piece of lumber) with respect to the tool 200. In some examples, the one or more rollers 112C can be substantially aligned with a top surface of the table 120 to minimize pitching, bending, tilting, or other movements of the workpiece during placement and/or movement of the workpiece. In some examples, the one or more rollers 112C can be adjustable with respect to the stand 112 or the table 120. For instance, at least one of a distance of the one or more rollers 112C from the table 120 can be adjusted or a height of the one or more rollers 112C with respect to the table 120 can be adjusted. For instance, a distance of the one or more rollers 112C from the table 120 can be adjusted to provide a wider base, for instance, to improve supporting of a workpiece within the tool apparatus 100.

In some examples, the table 120 can be placed on a something other than the stand 112, such as, for instance, the ground, a table, sawhorses, a workbench, or any other object or surface capable of supporting the tool apparatus 100.

Figure 2:
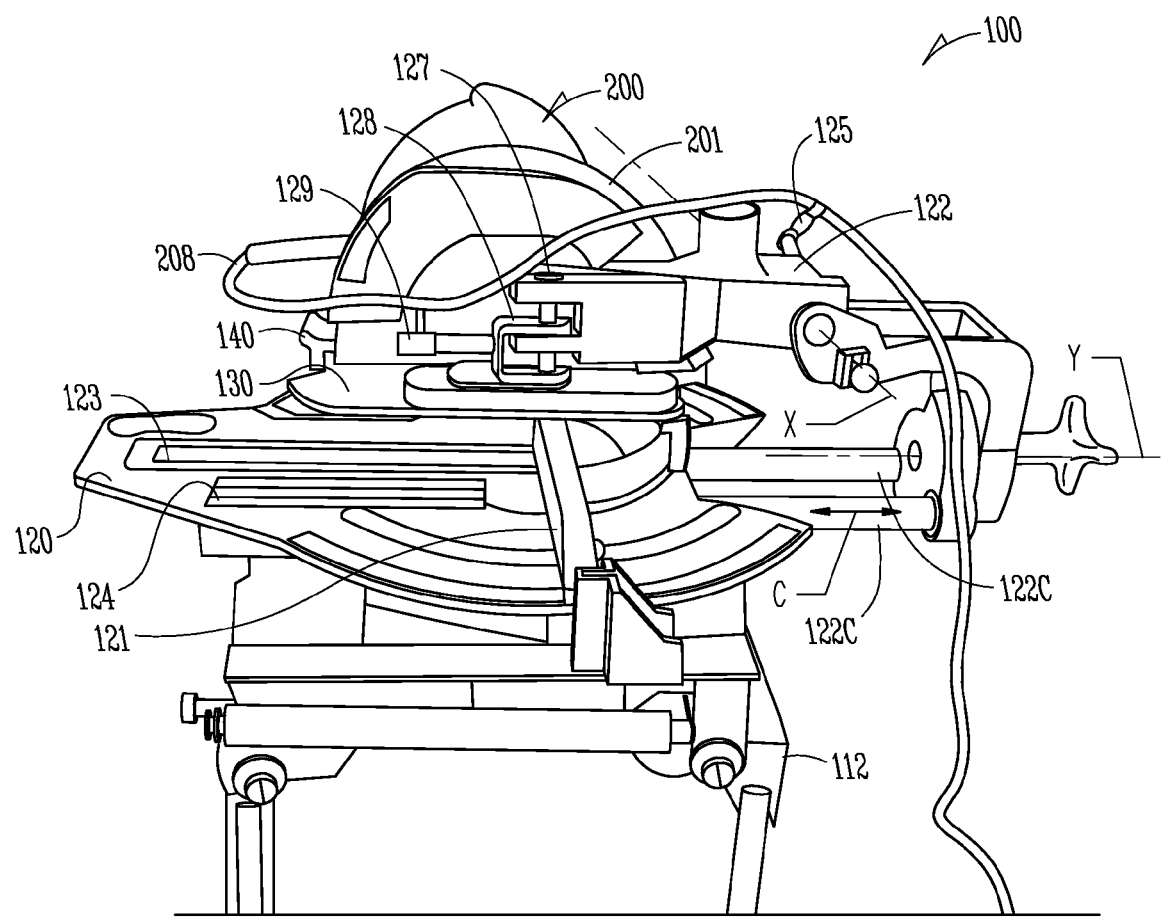
FIG. 2 is a right side perspective view of a tool apparatus in accordance with at least one embodiment of the invention, the tool apparatus being in a first mode.
Figure 3:
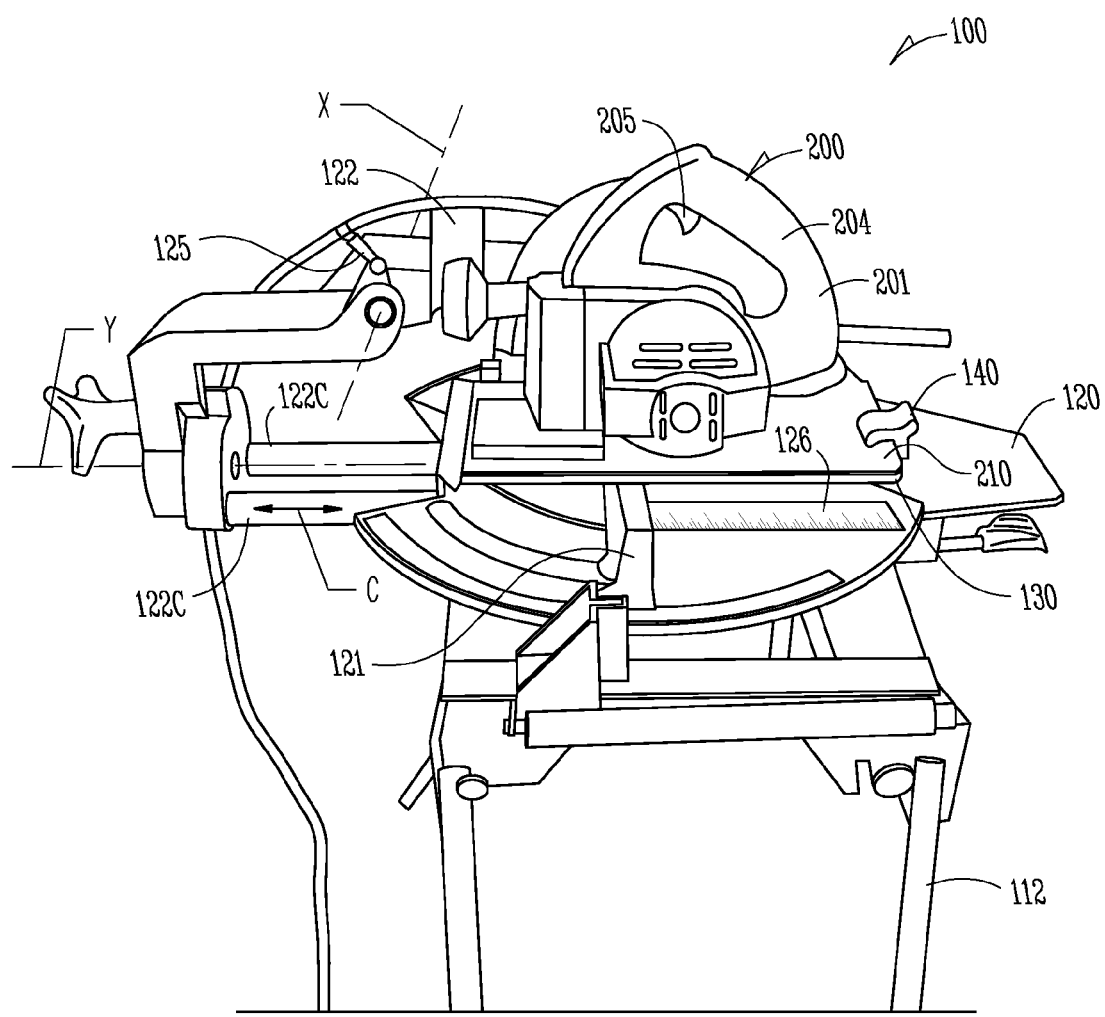
FIG. 3 is a left side perspective view of a tool apparatus in accordance with at least one embodiment of the invention, the tool apparatus being in a first mode.
Figure 4:
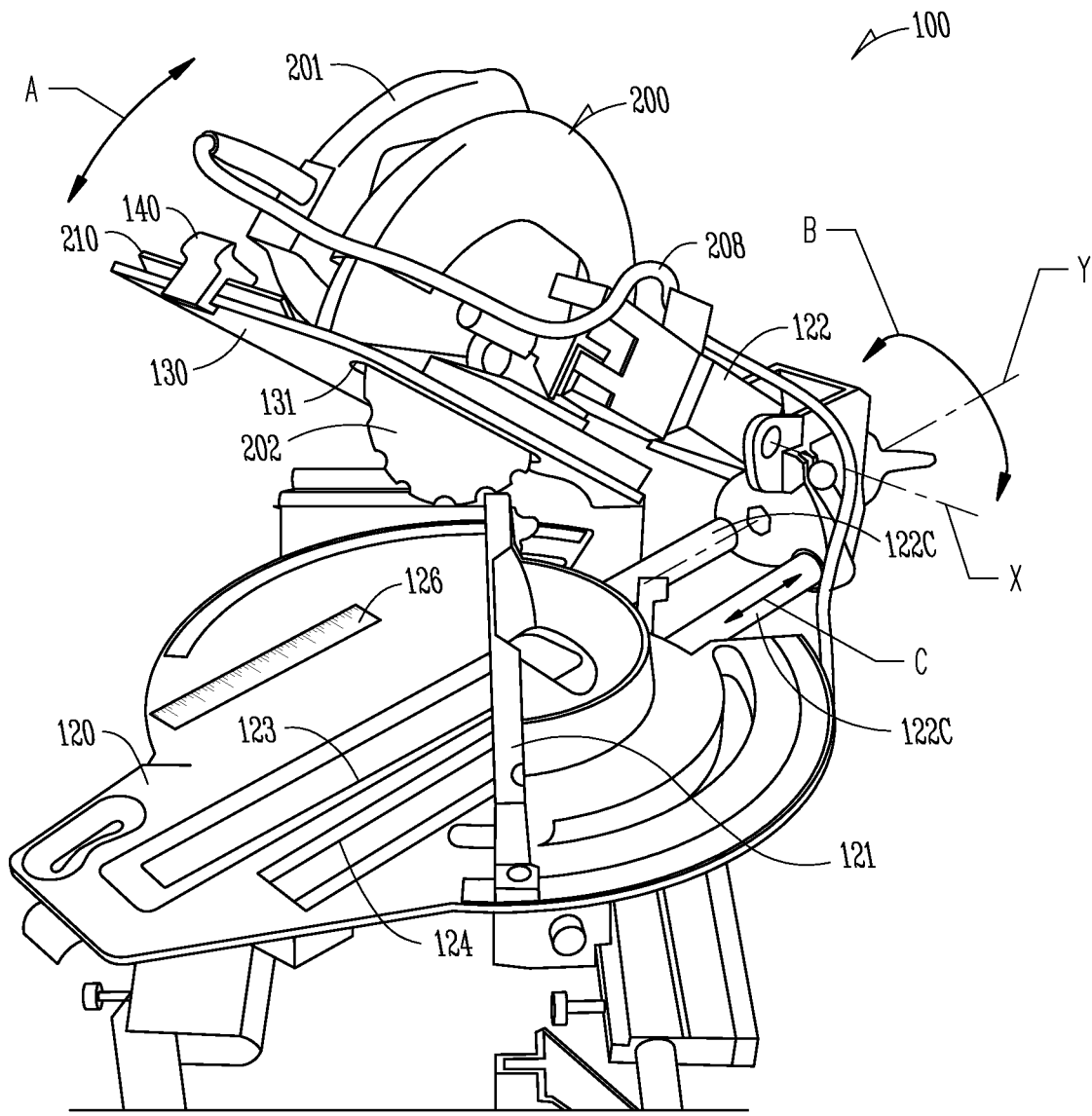
FIG. 4 is a right side perspective view of a tool apparatus in accordance with at least one embodiment of the invention, the tool apparatus being in a first mode.

Referring to FIGS. 1-4, the base 110, in some examples, includes an arm 122 selectively movable with respect to the base 110. In some examples, the arm 122 is moveable in at least one direction with respect to the base 110. For instance, the arm 122, in some examples, is selectively rotatable about a first arm axis X (FIG. 4) to allow rotation of the arm 122 along arrow A (FIG. 4). In further examples, the arm 122 can be selectively configurable to rotate about the first arm axis X or constrained from rotating about the first arm axis X (for instance, by toggling a lock pin or other such structure) to enable the arm 122 to lock in a position for some purposes (transportation, storage, or one or more operational modes of the tool apparatus 100, for example) or move at least about the first axis X for some purposes (one or more operational modes of the tool apparatus 100, maintenance, or cleaning, for example).

Figure 15A:
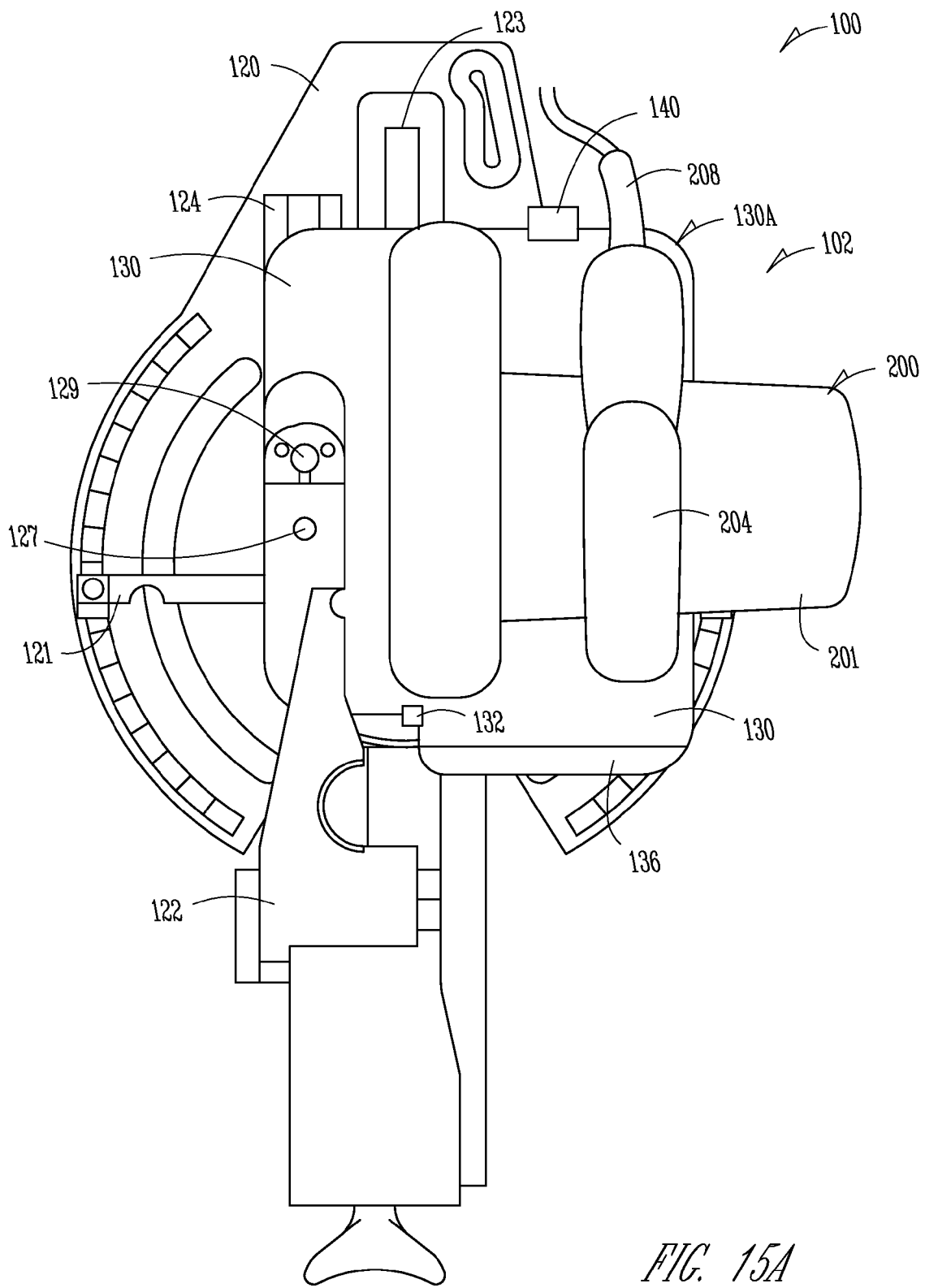
FIG. 15A is a top view of a tool apparatus in accordance with at least one embodiment of the invention, a tool being coupled to a base plate, the base plate being in a first position.
Figure 15B:
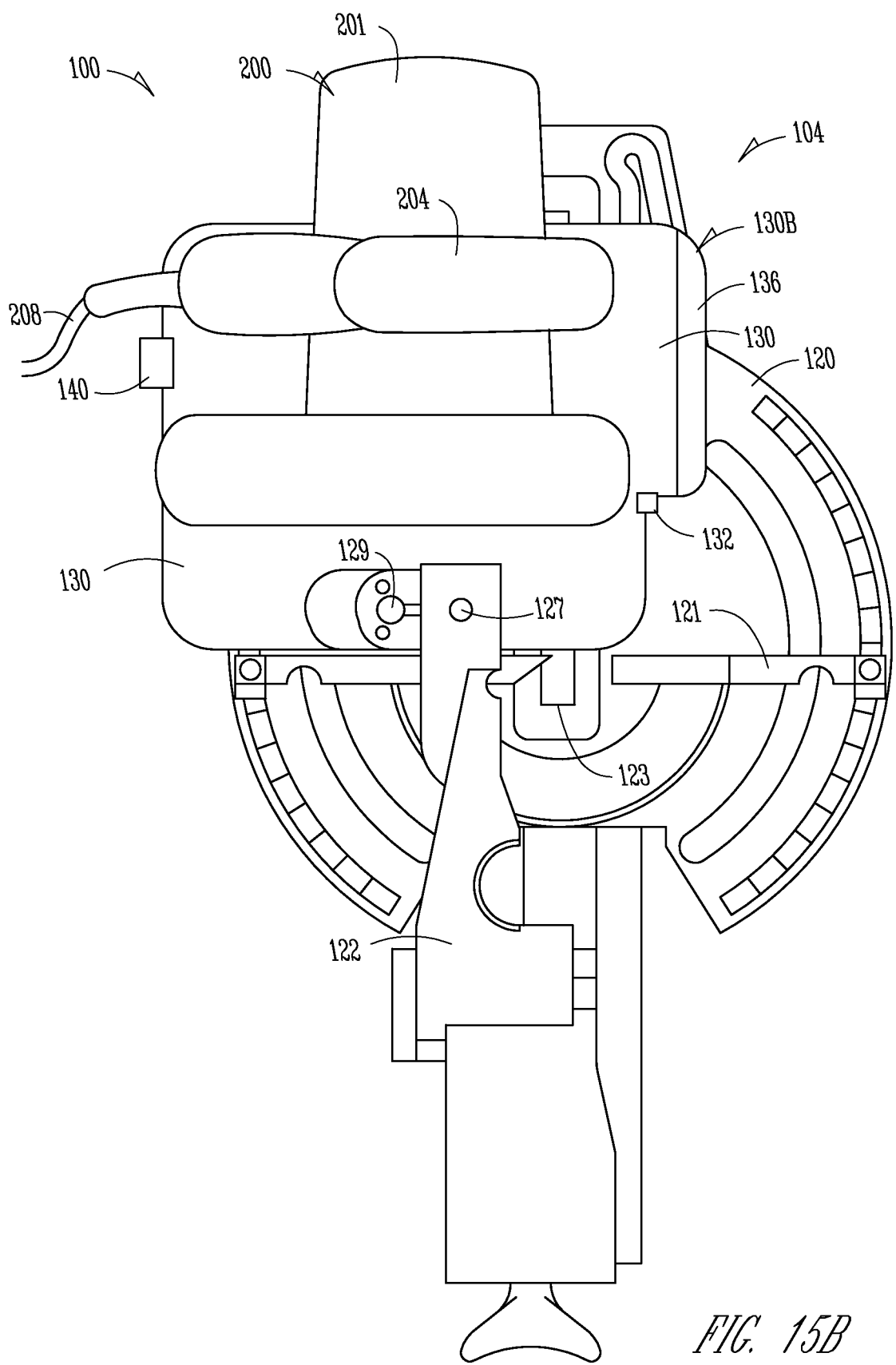
FIG. 15B is a top view of a tool apparatus in accordance with at least one embodiment of the invention, a tool being coupled to a base plate, the base plate being in a second position.

In some examples, a base plate 130 is engaged with the arm 122. The base plate 130, in some examples, is configured to detachably receive the tool 200, with the tool 200 being configured to be detachably coupled to the base plate 130, as will be described in more detail herein. In some examples, with the tool 200 coupled to the base plate 130, the tool 200 is able to move with the arm 122, for instance along the arrow A (FIG. 4), for instance, to perform operations with the tool 200 on a workpiece or other object. In some examples, the base plate 130 is pivotably engaged with the arm 122. For instance, as seen in FIGS. 15A and 15B, the base plate 130 is pivotable with respect to the arm 122 between a first position 130A (FIG. 15A) and a second position 130B (FIG. 15B). In some examples, the base plate 130 is pivotable about a pin 127 engaging the arm 122 with the base plate 130. In some examples, the second position 130B is rotated substantially ninety degrees from the first position 130A. In some examples, when viewed from above, as shown in FIGS. 15A and 15B, the second position 130B of the base plate 130 is rotated counterclockwise substantially ninety degrees from the first position 130A. In other examples, however, the second position can be rotated clockwise from the first position, when viewed from above. In some examples, the base plate can include more than two positions. For instance, the base plate 130 can include a third position disposed substantially ninety degrees in a clockwise direction, when viewed from above, from the first position. In some examples, the first and second positions can be less than or more than ninety degrees apart. In different examples, various configurations of the base plate rotating with respect to the arm are contemplated, depending upon the type of tool to be used with the tool apparatus and the types of operations to be performed using the tool.

Figure 7:
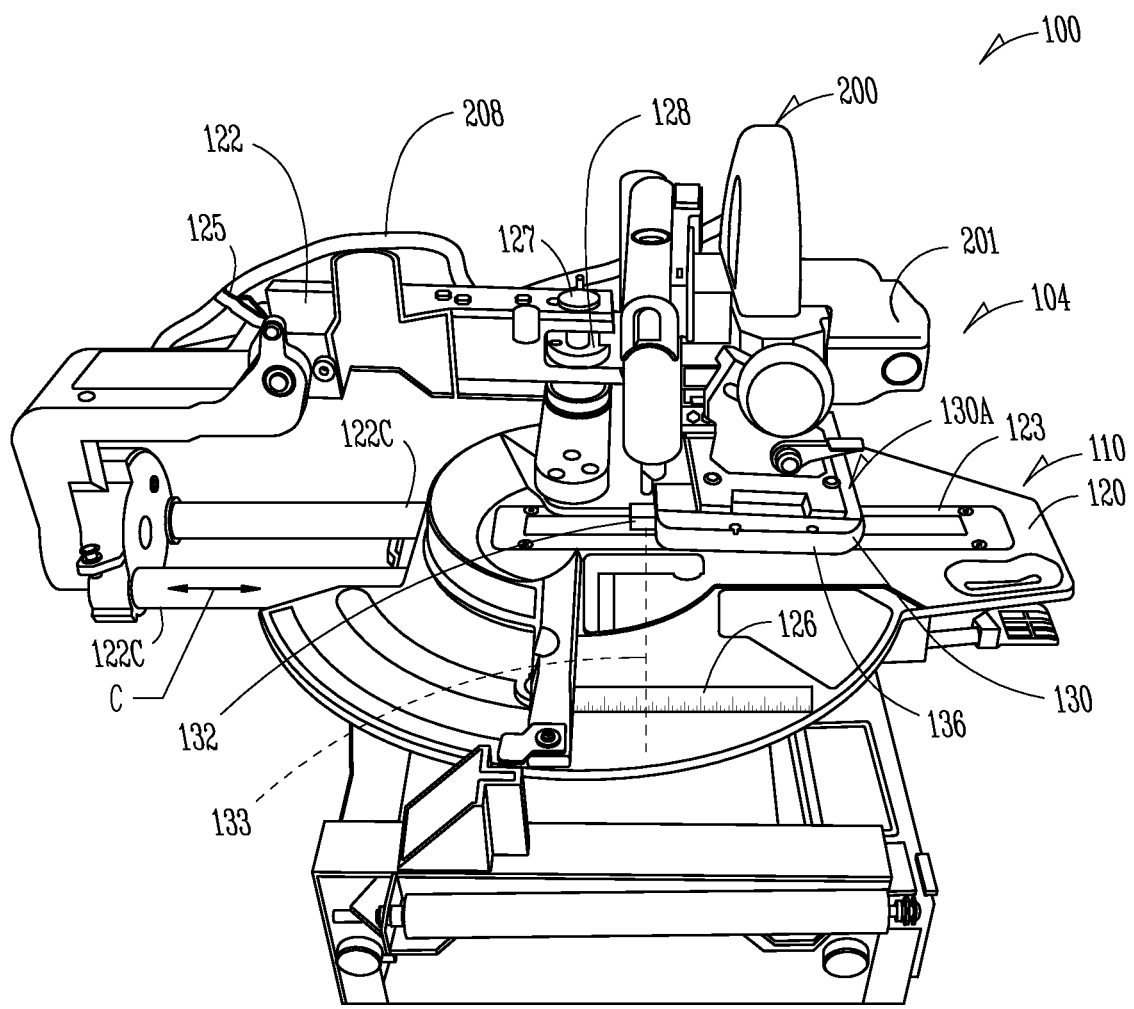
FIG. 7 is a left side perspective view of a tool apparatus in accordance with at least one embodiment of the invention, the tool apparatus being in a second mode.
Figure 8:
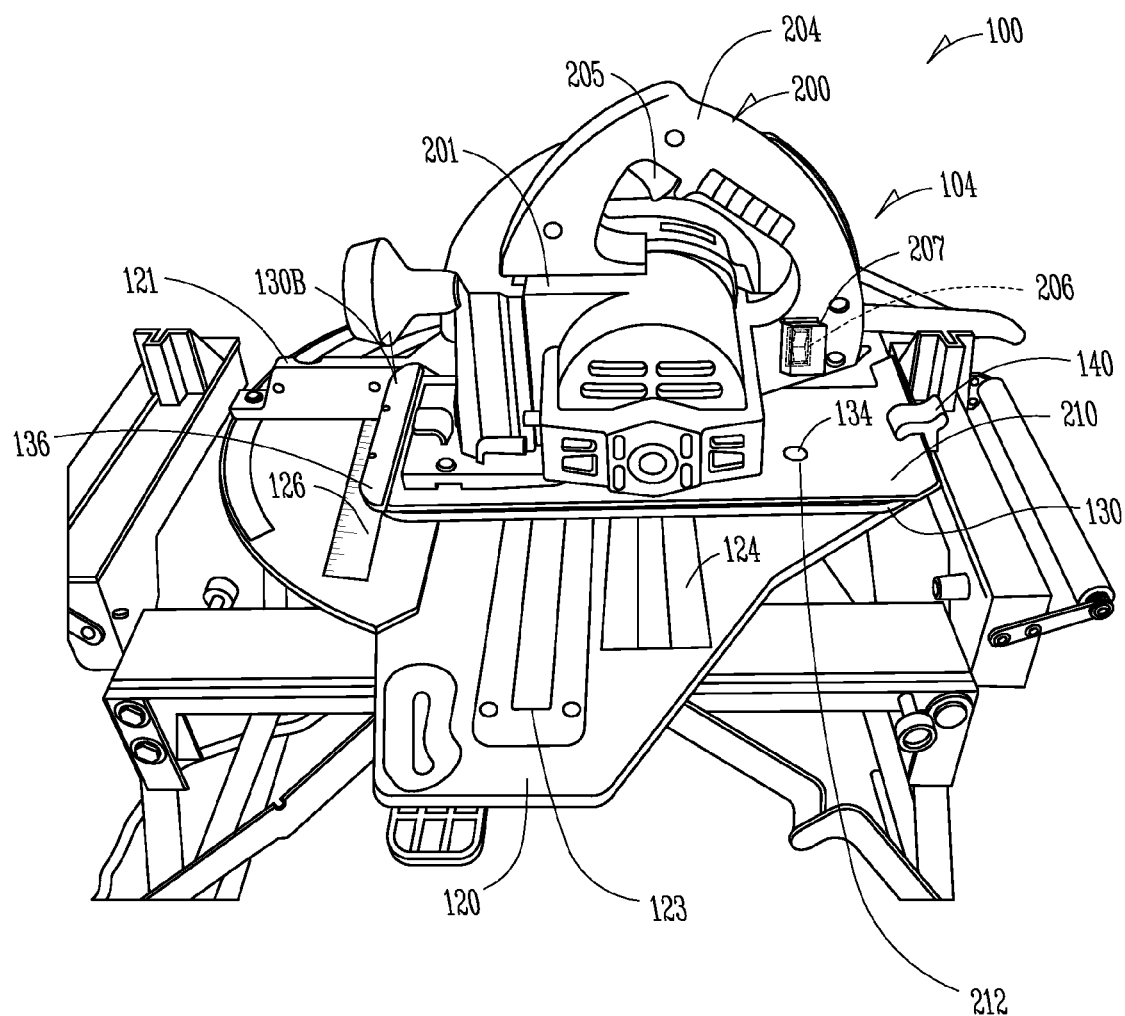
FIG. 8 is a back side perspective view of a tool apparatus in accordance with at least one embodiment of the invention, the tool apparatus being in a second mode.
Figure 9:
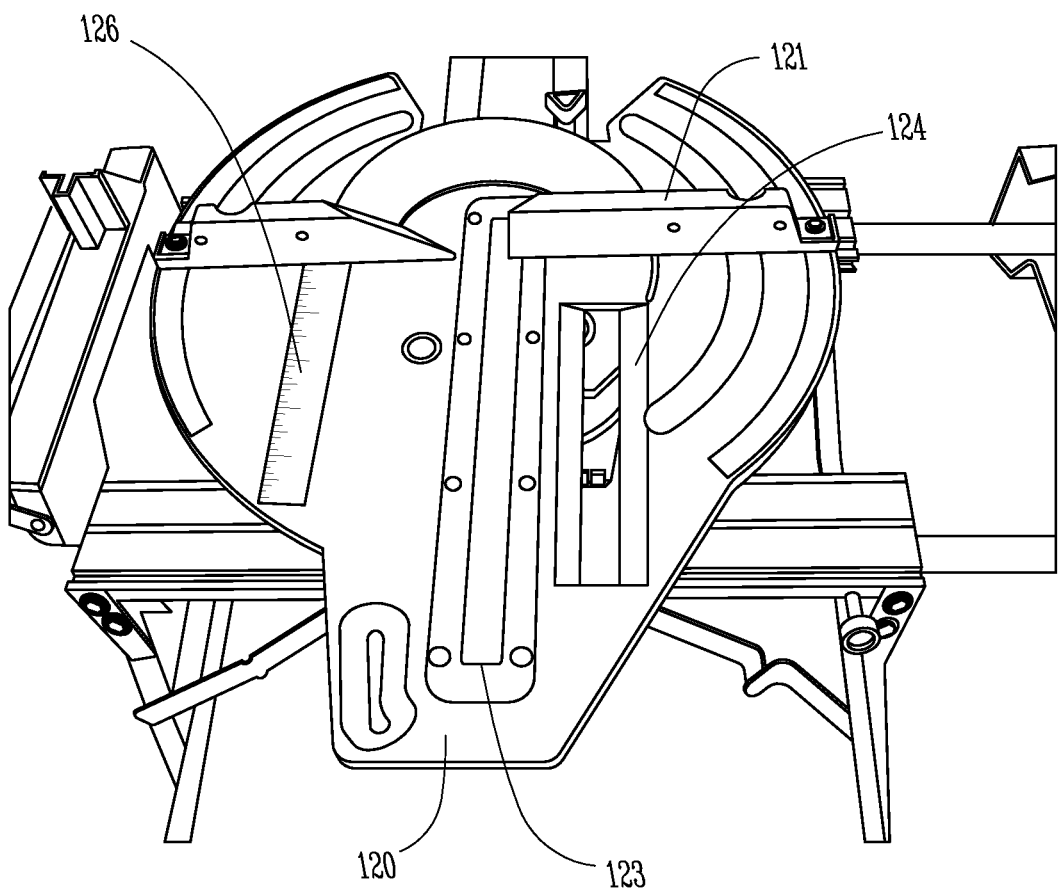
FIG. 9 is a back side perspective view of a base of a tool apparatus in accordance with at least one embodiment of the invention.
Figure 10:
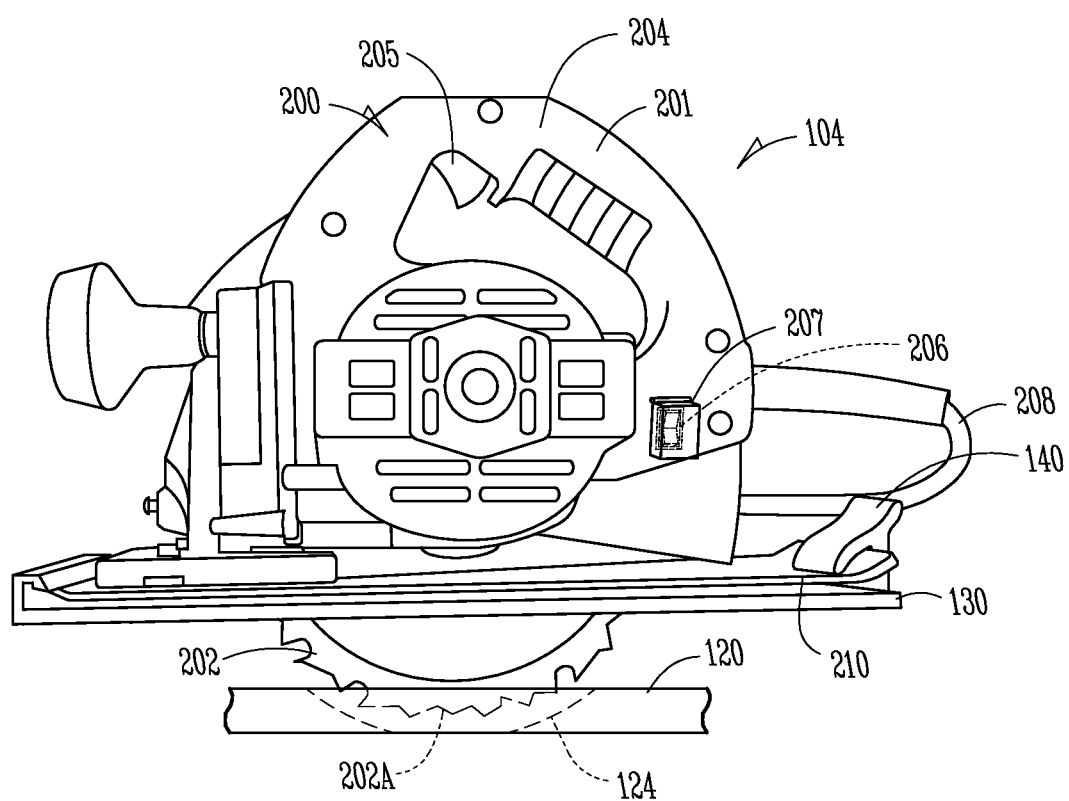
FIG. 10 is a back side perspective view of a tool apparatus in accordance with at least one embodiment of the invention, the tool apparatus being in a second mode.

In some examples, the tool apparatus 200 includes various operational modes, which can include one or more of the following modes. In some examples, the tool apparatus 100 includes a first mode with the tool 200 coupled to the base plate 130 and the arm 122 being selectively rotatable about the first arm axis X (see, for example, FIGS. 1-4). In some examples, the tool apparatus 100 includes a second mode with the tool 200 coupled to the base plate 130 and the arm 122 being constrained from rotating about the first arm axis X (see, for example, FIGS. 7 and 8). That is, in the second mode, the arm 122, in some examples, is substantially stationary with respect to the base 110. In some examples, the tool apparatus 100 includes a third mode with the tool 200 detached from the base plate 130, wherein the tool 200 can be used separate from the base 110 (see, for example, FIG. 16C).

In some examples, the first mode includes the base plate 130 in the first position 130A (see, for example, FIG. 15A), and the second mode includes the base plate 130 in the second position 130B (see, for example, FIG. 15B). In some examples, the first position 103A of the base plate 130 is rotated substantially ninety degrees from the second position 130B of the base plate 130. In other examples, as described herein, the first and second positions 130A, 130B can be more or less than ninety degrees apart. In some examples, the second position 130B is rotated counterclockwise, when viewed from above, from the first position 130A. In other examples, the second position 130B is rotated clockwise, when viewed from above, from the first position 130A. In still other examples, the second position 130B is rotated counterclockwise, when viewed from above, from the first position 130A, and the base plate 130 includes a third position rotated clockwise, when viewed from above, from the first position 130A. In various examples, the orientations and/or number of positions of the base plate 130 depend largely on the tool 200 being used with the tool apparatus 100.

Figure 16A:
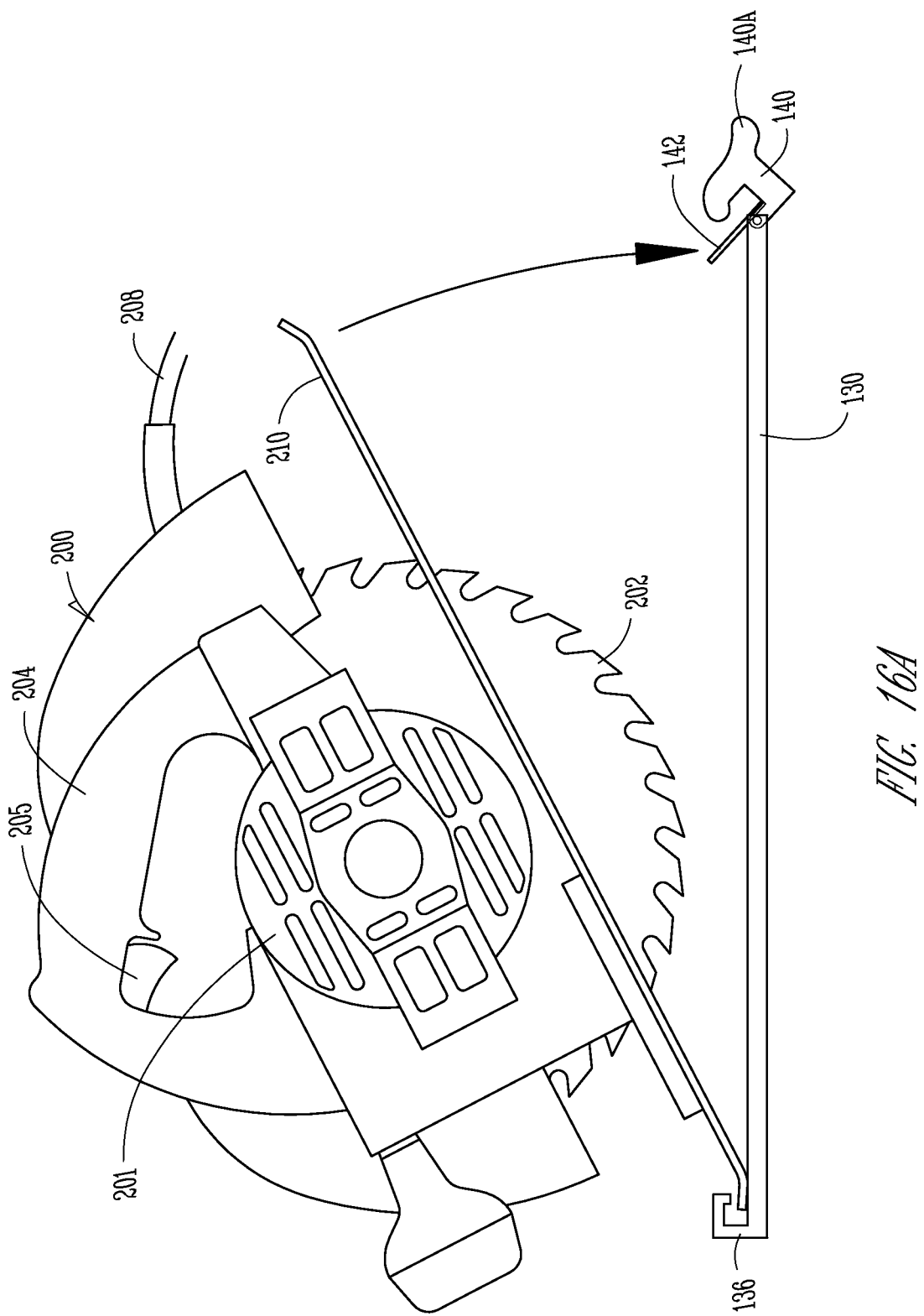
FIG. 16A is a left side view of a tool of a tool apparatus in accordance with at least one embodiment of the invention, the tool being coupled with a base plate of the tool apparatus.
Figure 16B:
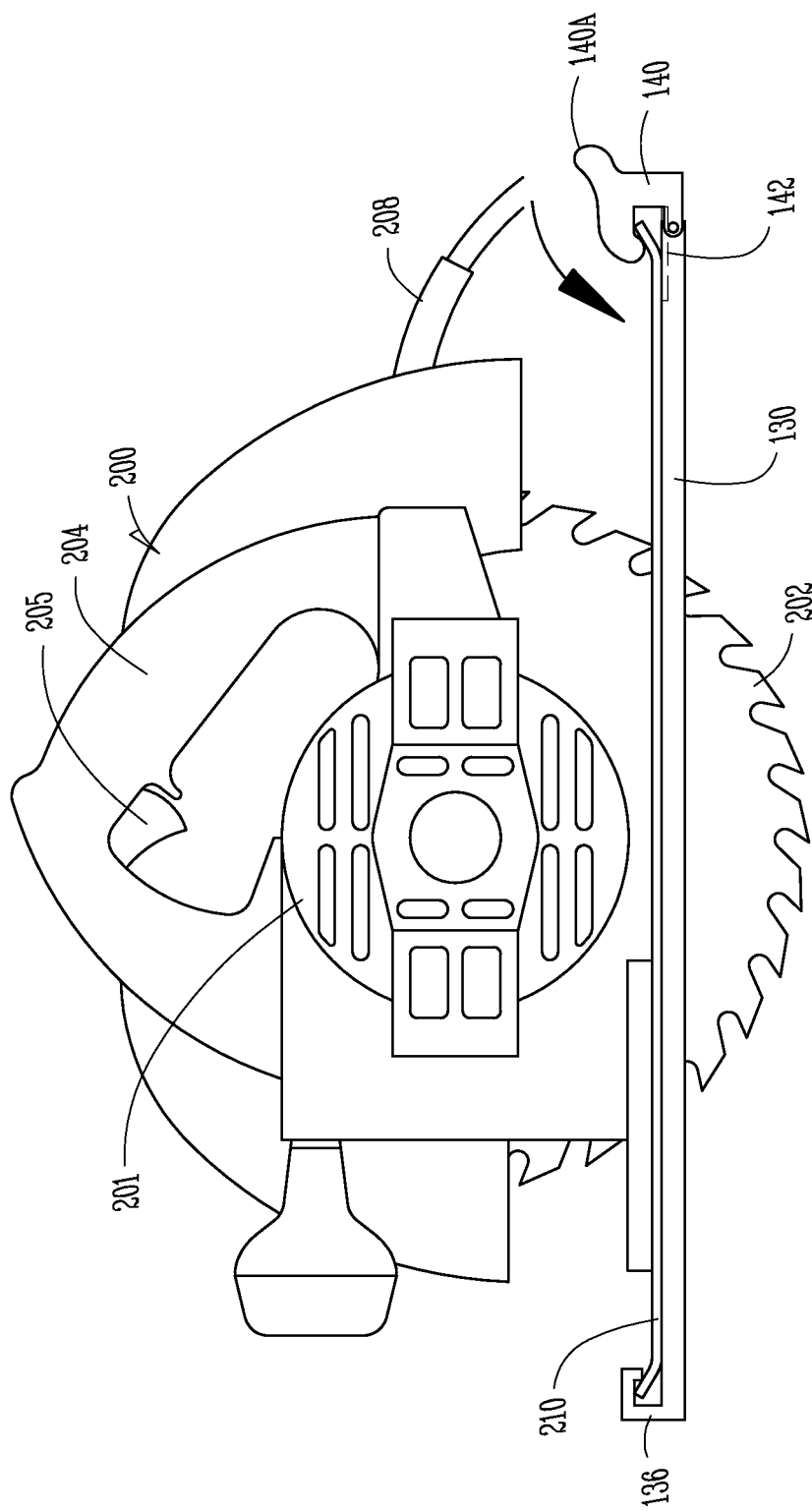
FIG. 16B is a left side view of a tool of a tool apparatus in accordance with at least one embodiment of the invention, the tool coupled with a base plate of the tool apparatus.
Figure 16C:
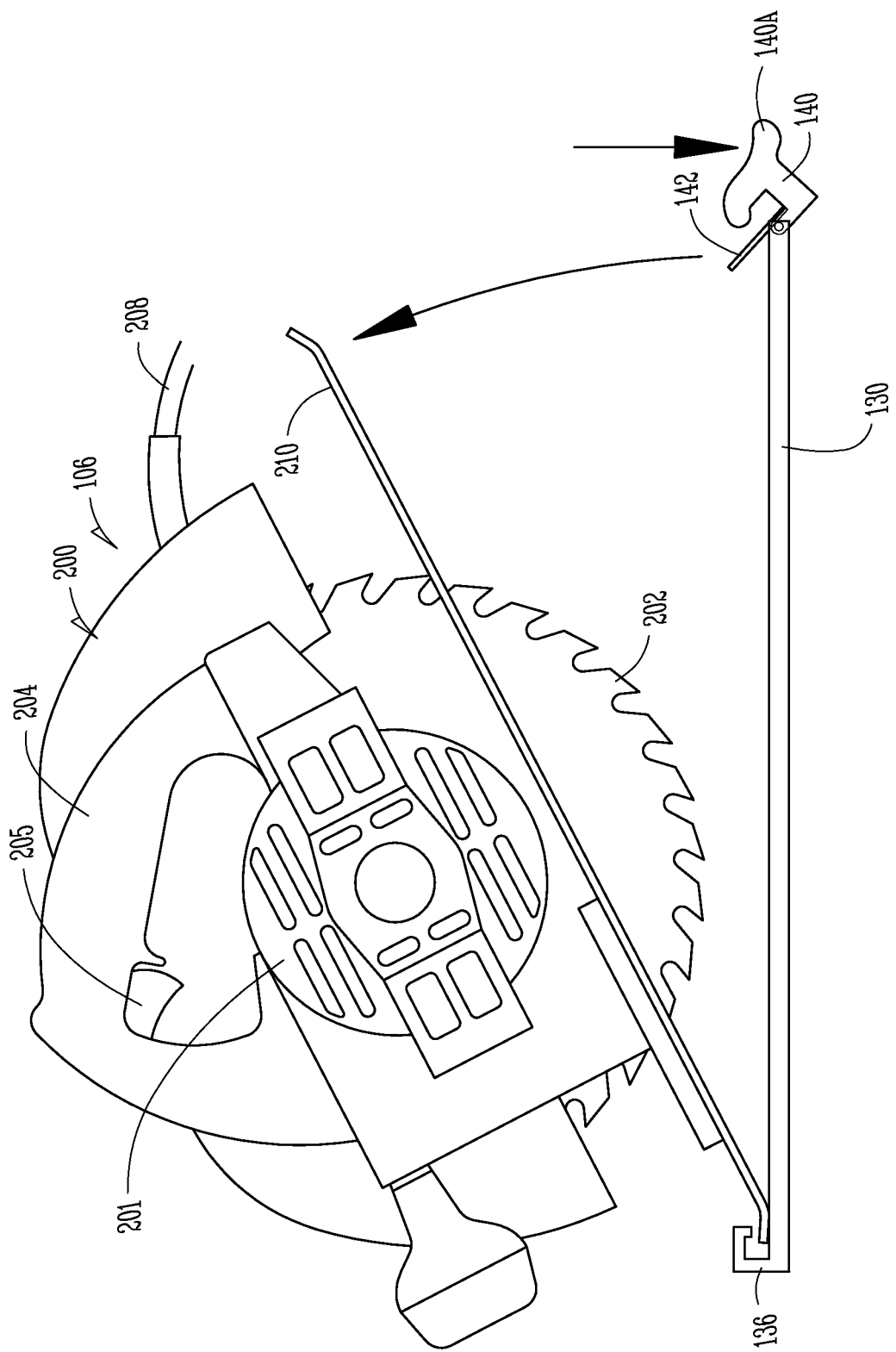
FIG. 16C is a left side view of a tool of a tool apparatus in accordance with at least one embodiment of the invention, the tool being removed from a base plate of the tool apparatus.

Referring to FIGS. 16A-16C, in some examples, the base plate 130 includes a clamp 140 configured to couple the tool 200 to the base plate 130. For instance, the third mode includes removal of the tool 200 and use of the tool 200 detached from the base plate 130. Various ways of detachably coupling the tool 200 with the base plate 130 are contemplated herein. In the example shown in FIGS. 16A-16C, the clamp 140 allows for ease in selectively coupling the tool 200 to and uncoupling the tool 200 from the base plate 130. That is, in some examples, the clamp 140 includes a tongue 142 which cooperates with a portion of the tool 200 when the tool 200 is pressed against the base plate 130 (see FIG. 16A), the tongue 142 actuating the clamp 140 to engage the tool 200 and couple the tool 200 to the base plate 130 (see FIG. 16B). To disengage the clamp 140 and remove the tool 200 from the base plate 130, in some examples, pressing downward on a tab 142 extending from the clamp 140 causes the clamp 140 to rotate away from the tool 200, allowing the tool 200 to be lifted off of the base plate 130 (see FIG. 16C).

It is contemplated that the present subject matter can be used with various types of tools. In some examples, the tool apparatus can include an unpowered hand tool, such as a hand drill, a chisel, a planer, or a clamp or vice, for instance. In other examples, the tool apparatus can include a power tool, such as, a circular saw, a drill, a reciprocating saw, a grinder, a screw gun, a sander, a router, or a jig saw, for instance. For the purposes of illustration, the following description is directed toward the tool apparatus 100 including a circular saw 200 as the tool 200. However, this is not intended to be limiting, as other tools can be used with the tool apparatus, including, but not limited to, the example tools listed herein.

Referring generally to FIGS. 1-8, in some examples, the circular saw 200 includes a housing 201 substantially surrounding interior components including a motor, a drive system, and control circuitry. The circular saw 200, in some examples, includes a handle 204 configured for a user to hold, manipulate, and/or operate the circular saw 200. In some examples, the handle 204 is integrally formed with the housing 201. In other examples, the handle 204 is separately formed from but attached to the housing 201. At least partially exposed from the housing 201 is a saw blade 202 that is configured to selectively rotate with respect to the housing 201. The saw blade 202, in some examples, is operatively coupled to the motor, for instance via the drive system, to rotate with operation of the motor. In this way, the saw blade 202 can be rotated during operation of the circular saw 200, for instance to cut a workpiece. The workpiece can include any object that is to be cut, including, but not limited to, a piece of wood, metal, composite material, polymer, plastic, or fiberglass, to name a few.

The circular saw 200 includes a saw shoe 210, in some examples, that is configured to provide a substantially flat surface or base along which the circular saw 200 can be slid during operation in the third mode or at other times with the circular saw 200 detached from the base plate 130. For instance, the saw shoe 210 can be slid along the workpiece while cutting the workpiece to allow the user to apply force on the circular saw 200 toward the workpiece to assist in maintaining the saw blade 202 in contact with the workpiece and to improve control of the circular saw 200 during operation. The saw shoe 210, in other examples, provides a surface or portion which can be engaged with the base plate 130, for instance, during operation in the first and second modes.

In some examples, the saw shoe 210 can be adjusted relative to the saw blade 202. For instance, in some examples, the height of the saw shoe 210 can be adjusted relative to the saw blade 202 to increase or decrease a distance that the saw blade 202 extends from the saw shoe 210, thereby increasing or decreasing a depth that the saw blade 202 can cut into the workpiece. In some examples, referring specifically to FIGS. 5A and 5B, an angle D of the saw blade 202 can be adjusted with respect to the saw shoe 210. For instance, in some examples, the saw blade 202 can be adjusted between a position extending substantially perpendicularly from the saw shoe 210 (FIG. 5A) to a position in which the angle D is between about zero and about ninety degrees (FIG. 5B). In some examples, it is contemplated that the angle D between the saw blade 202 and the saw shoe 210 is adjustable between about ninety degrees and about 180 degrees. In further examples, it is contemplated that the angle D between the saw blade 202 and the saw shoe 210 is adjustable between about zero degrees and about 180 degrees. By adjusting the angle D of the saw blade 202, the user can alter the angle of the cut made by the saw blade 202 through the workpiece.

Referring again to FIGS. 1-8, the circular saw 200 can include various controls in some examples. For instance, the circular saw 200 can include a control to cause rotation of the saw blade 202. In some examples, the control to cause rotation of the saw blade 202 includes a trigger 205 or other switch, wherein pushing of the trigger 205 causes rotation of the saw blade 202 and releasing of the trigger 205 ceases rotation of the saw blade 202. In some examples, the trigger 205 is disposed proximate the handle 204 to facilitate the user being able to hold the circular saw 200 with the handle 204 while, at the same time, selectively actuate the saw blade 202 using the trigger 205. In other examples, other types of on/off controls disposed in other locations of the circular saw 200 can be used, either in addition to or in lieu of the trigger 205. For instance, in some examples, a constant-on switch 206 (FIG. 8) can be used in addition to the trigger 205. The constant-on switch 206 can include a toggle switch in which placement of the constant-on switch 206 in a first toggle position causes the saw blade 202 to rotate (without the user having to push the trigger 205, for instance) and placement of the constant-on switch 206 in a second toggle position causes the saw blade 202 to cease rotating. The constant-on switch 206 can include a shield 207 in some examples, for instance, to inhibit accidental actuation of the constant-on switch 206. In some examples, the shield 207 is hinged to the housing 201 to allow the user to selectively open the shield 207 in order to actuate the constant-on switch 206. The shield 207, in some examples, can protect against the constant-on switch 206 being accidently bumped (for instance, by an object that the circular saw 200 passes by, the ground, an object in a bag or other container that the circular saw 200 is in, a child, or the like). The constant-on switch 206 will be described in more detail herein. In other examples, the circular saw 200 includes additional controls, such as, for instance, a speed control for the saw blade 202, a light control (for instance, to turn on or off one or more lights disposed on the circular saw 200 for use in low-light areas), or the like. In some examples, the trigger 205 can also be used as the speed control, such that the speed of the saw blade 202 can be varied by an amount by which the trigger 205 is pushed.

In some examples, the circular saw 200 includes a cord 208 configured to electrically connect the circular saw 200 to a power source, such as, for instance, a wall outlet, a power strip, an extension cord, or a generator. In some examples, the base 110 of the tool apparatus 100 includes an attached power strip to allow for a nearby outlet in which to plug the cord 208 of the circular saw 200, for instance, when the circular saw 200 is being used with the base 110 of the tool apparatus 100. In some examples, the circular saw 200 includes one or more cord holders 125, for instance, to organize the cord 208 and keep the cord 208 out of the way or away from the saw blade 202. In some examples, the one or more cord holders 125 include one or more spring loaded clips 125 configured to release or accept the cord 208 with squeezing of the spring loaded clip 125. In some examples, at least one cord holder 125 is mounted on the arm 122. In other examples, the circular saw 200 can be cordless and run on battery power.

Figure 17A:
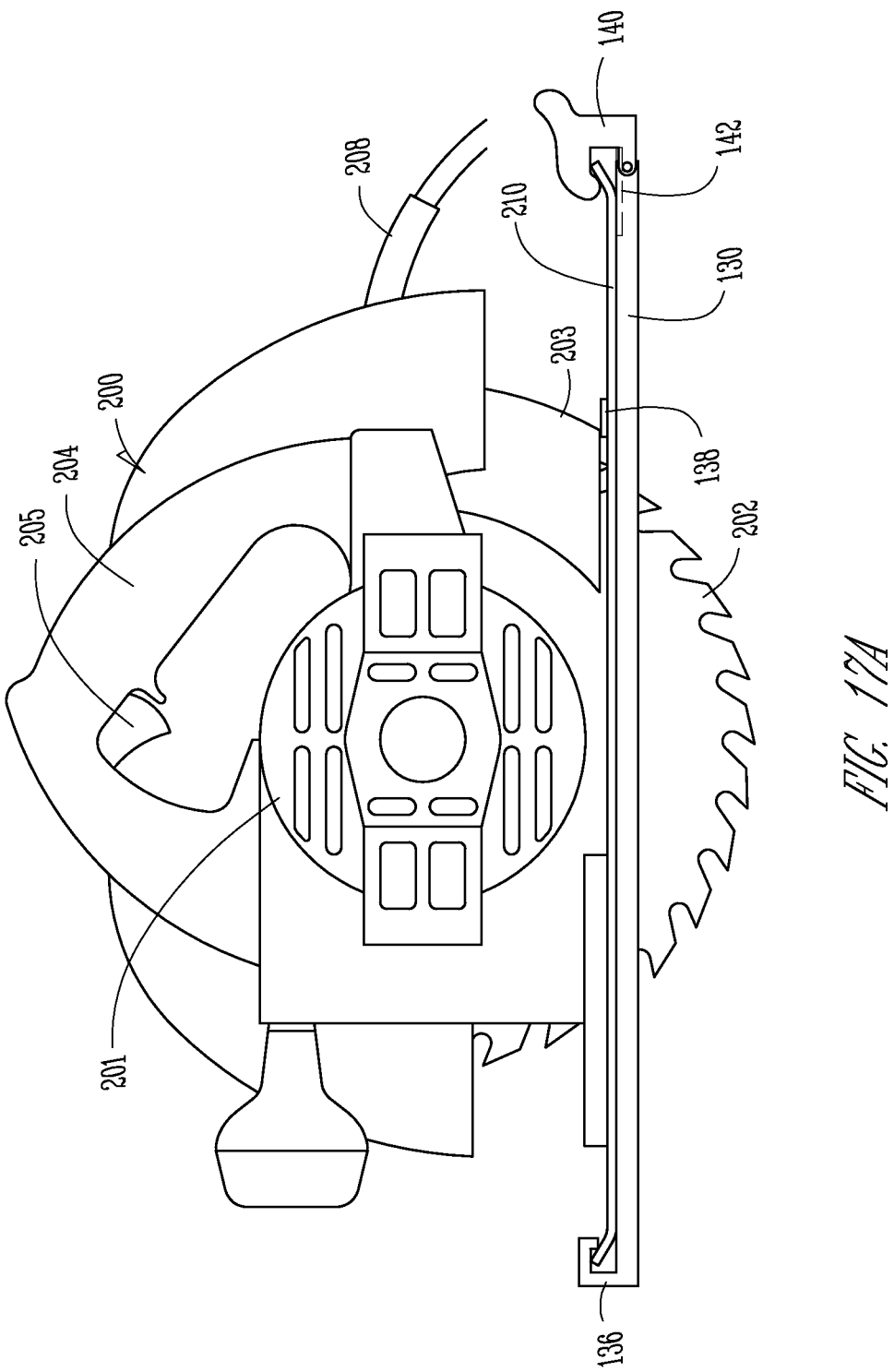
FIG. 17A is a left side view of a tool of a tool apparatus in accordance with at least one embodiment of the invention, the tool being coupled with a base plate of the tool apparatus and a guard of the tool being in a raised position.
Figure 17B:
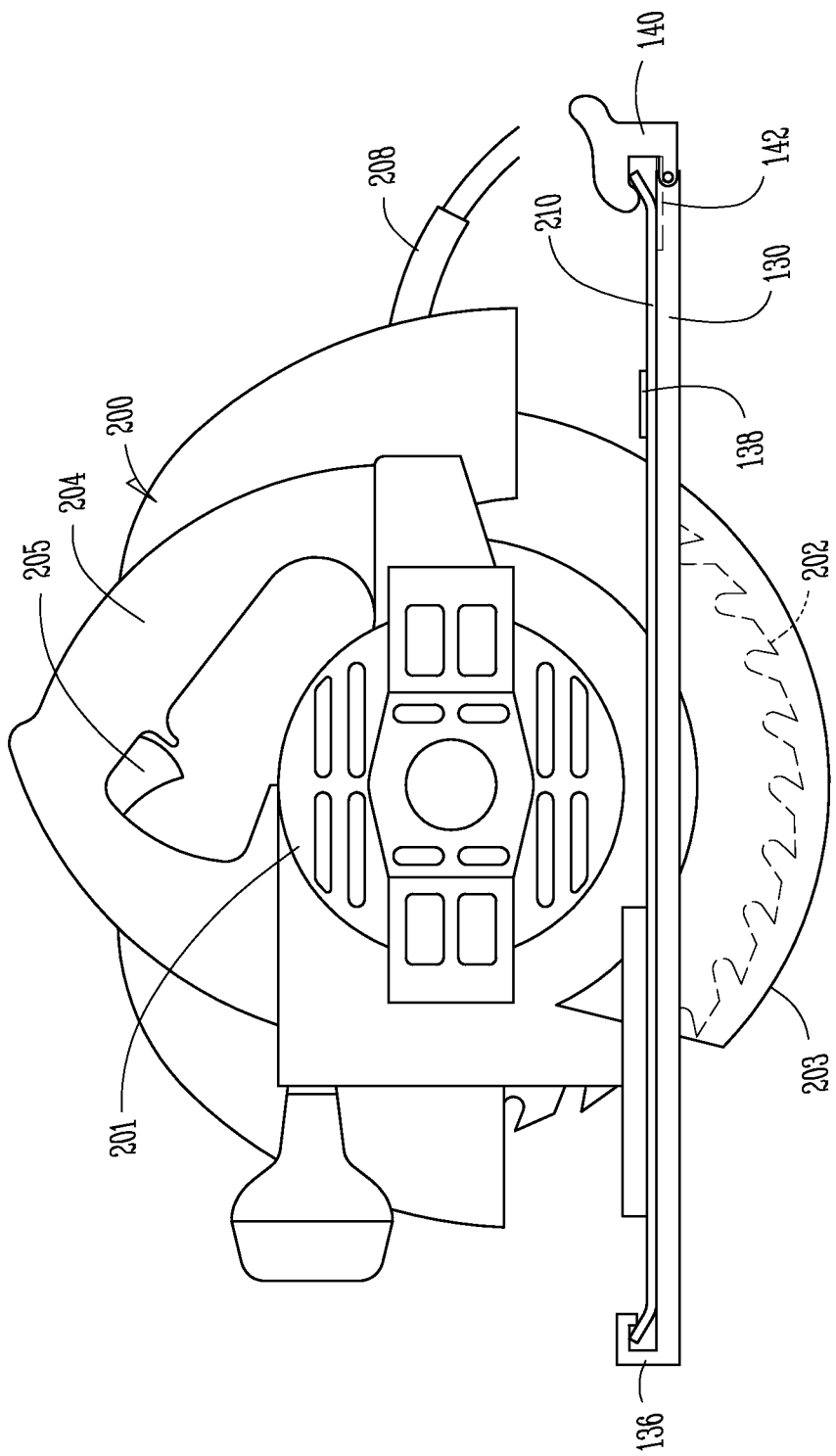
FIG. 17B is a left side view of a tool of a tool apparatus in accordance with at least one embodiment of the invention, the tool being coupled with a base plate of the tool apparatus and a guard of the tool being in a lowered position.

In some examples, with reference to FIG. 17B, the circular saw 200 includes a blade guard 203 configured to selectively cover the saw blade 202 to protect against inadvertent cutting of an object. In some examples, the blade guard 203 is configured to retract as the blade guard 203 is contacted by (or contacts) the workpiece. In some examples, the blade guard 203 can be manually retracted by the user (for instance, with the operation of a lever). In some examples, the blade guard 203 is spring-biased in a position covering some or all of the saw blade 202.

Referring now to FIGS. 1-6B, in some examples, the tool apparatus 100 in the first mode includes the circular saw 200 coupled to the base plate 130, the first mode including a miter saw mode 102. In some examples, the circular saw 200 is coupled to the base plate 130 in the first position 130A (see FIG. 15A) with the tool apparatus 100 in the miter saw mode 102. In some examples, the circular saw 200 can be coupled to the base plate 130 by placing a front of the saw shoe 210 within a lip 136 of the base plate 130 and rotating the circular saw 200 such that a back of the saw shoe 210 presses against the tongue 142 of the clamp 140 to actuate the clamp 140 (see FIG. 16A). Pressing against the tongue 142, in some examples, causes the clamp 140 to rotate toward and over the back of the saw shoe 210 to engage the circular saw 200 and couple the circular saw 200 to the base plate 130 (see FIG. 16B). With the circular saw 200 coupled to the base plate 130, the saw blade 202 at least partially extends through a slot 131 in the base plate 130. The slot 131 of the base plate 130, in at least some examples, is sized and shaped to allow the saw blade 202 to rotate without interference from the slot 131, such as, for instance, the saw blade 202 rubbing against a side of the slot 131.

In the miter saw mode 102, in some examples, the arm 122 of the tool apparatus 100 is rotatable about the first arm axis X, such that the circular saw 200, coupled to the base plate 130, is able to be moved with respect to the table 120 along arrow A. For instance, the circular saw 200 and base plate 130 can be rotated along the arrow A toward the table 120 to make a cut in a workpiece placed on the table 120. In some examples, the arm 122 can be rotated about the first arm axis X to make a chop cut in a workpiece with the circular saw 200. In this way, the tool apparatus 100, when in the miter saw mode 102, performs in a manner similar to a miter saw. That is, in some examples, the workpiece can be placed on the table 120 generally beneath the saw blade 202, extending through the slot 131 of the base plate 130, and aligned with respect to where the user wants to cut the workpiece. The arm 122 and the circular saw 200 (with the saw blade 202 rotating) can then be rotated about the first arm axis X toward the workpiece and the table 120 to make the cut through the workpiece.

In some examples, the table 120 includes a slot 123 within or through the table 120 to allow at least a portion of the saw blade 202 to pass into or through, for instance, to allow the saw blade 202 to pass completely through the workpiece and, thereby, cut through the entire width of the workpiece, should it be desired by the user to do so. In some examples, the slot 123 includes a hole through the table 120. In some examples, the slot 123 includes a groove or channel in the top of the table 120 that does not pass entirely through the table 120. In some examples, the table 120 includes a fence 121 to assist in positioning the workpiece. For instance, the fence 121 can include a substantially straight wall or other projection extending from a top surface of the table 120 configured such that a workpiece can be placed against it to facilitate placement of the workpiece at a particular angle with respect to the saw blade 202. In this way, the user can place the workpiece against the fence 121 of the tool apparatus 100 in the miter saw mode 102 and, depending on the orientation of the circular saw 200 and the arm 122, make a cut in the workpiece at a particular angle.

For instance, in some examples, with reference to FIGS. 1-3, the circular saw 200 and the arm 122 are positioned substantially perpendicular to the fence 121, such that the saw blade 202, in this configuration, can cut the workpiece at an angle substantially perpendicular to a side or other portion of the workpiece that is placed against the fence 121. In other examples, it is contemplated that an angle of the arm 122 and the circular saw 200 can be adjusted with respect to the fence 121 in order to allow for cuts in the workpiece at various angles. In some examples, the fence 121 remains stationary with respect to the table 120. For instance, in some examples, with reference to FIG. 4, the circular saw 200, the arm 122, and the table 120 have been rotated such that an angle of the saw blade 202 is no longer substantially perpendicular to the fence 121. In some examples, the angle of the saw blade 202 can be adjusted between zero degrees and ninety degrees with respect to the fence 121. In some examples, the angle of the saw blade 202 can be adjusted between zero degrees and 180 degrees with respect to the fence 121. By rotating the saw blade 202 to an angle other than ninety degrees with respect to the fence 121, the user may perform angled cutting (such as, for instance, miter cuts) of the workpiece.

With continued reference to FIG. 4, in some examples, the arm 122 can be rotated about a second arm axis Y in a direction of arrow B to adjust an angle of the saw blade 202 with respect to the table 120. For instance, in some examples, the saw blade 202, in an example, can be substantially perpendicular to a top of the table 120 to make straight cuts through the workpiece. In other examples, the arm 122 can be rotated along the arrow B clockwise or counterclockwise about the second arm axis Y such that the saw blade 202 is at an angle other than ninety degrees with respect to the top of the table 120 in order to make angled cuts in the workpiece. In some examples, the angle of the saw blade 202 with respect to the top of the table 120 and the angle of the saw blade 202 with respect to the fence 121 can both be adjusted, for instance, to perform compound miter cuts in the workpiece.

Figure 5A:
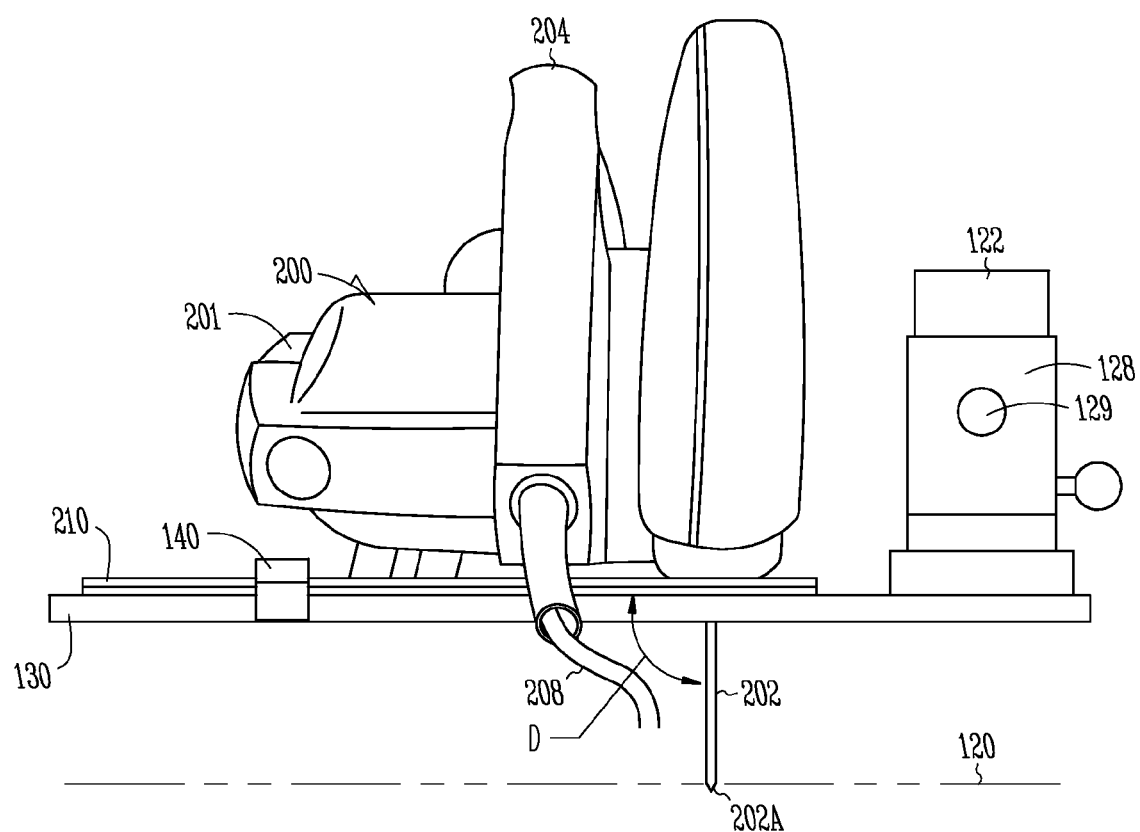
FIG. 5A is a rear view of a tool apparatus in accordance with at least one embodiment of the invention.
Figure 5B:
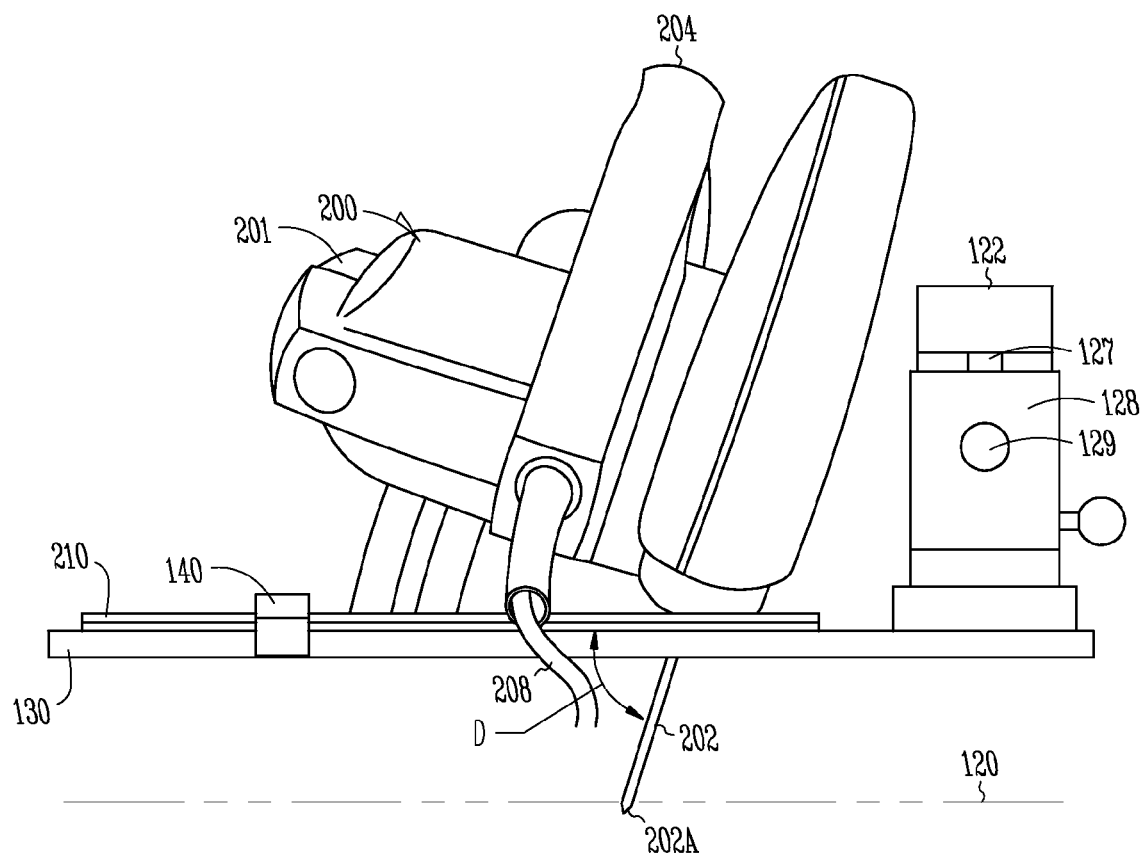
FIG. 5B is a rear view of a tool apparatus in accordance with at least one embodiment of the invention, a tool being pivoted with respect to a base of the tool apparatus.
Figure 6A:
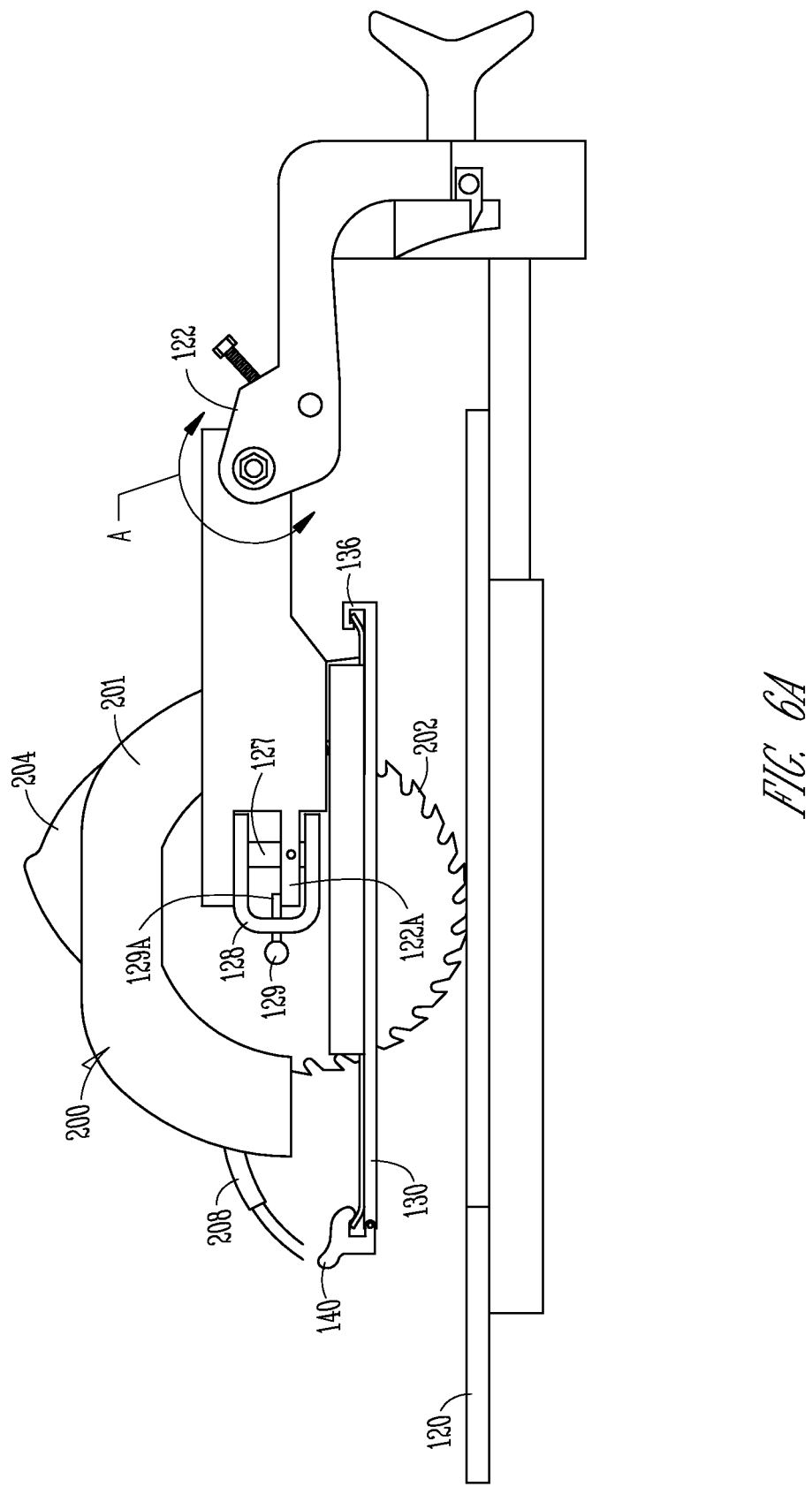
FIG. 6A is a right side view of a tool apparatus in accordance with at least one embodiment of the invention, a tool and a swivel of the tool apparatus being in a raised position with respect to a base of the tool apparatus.
Figure 6B:
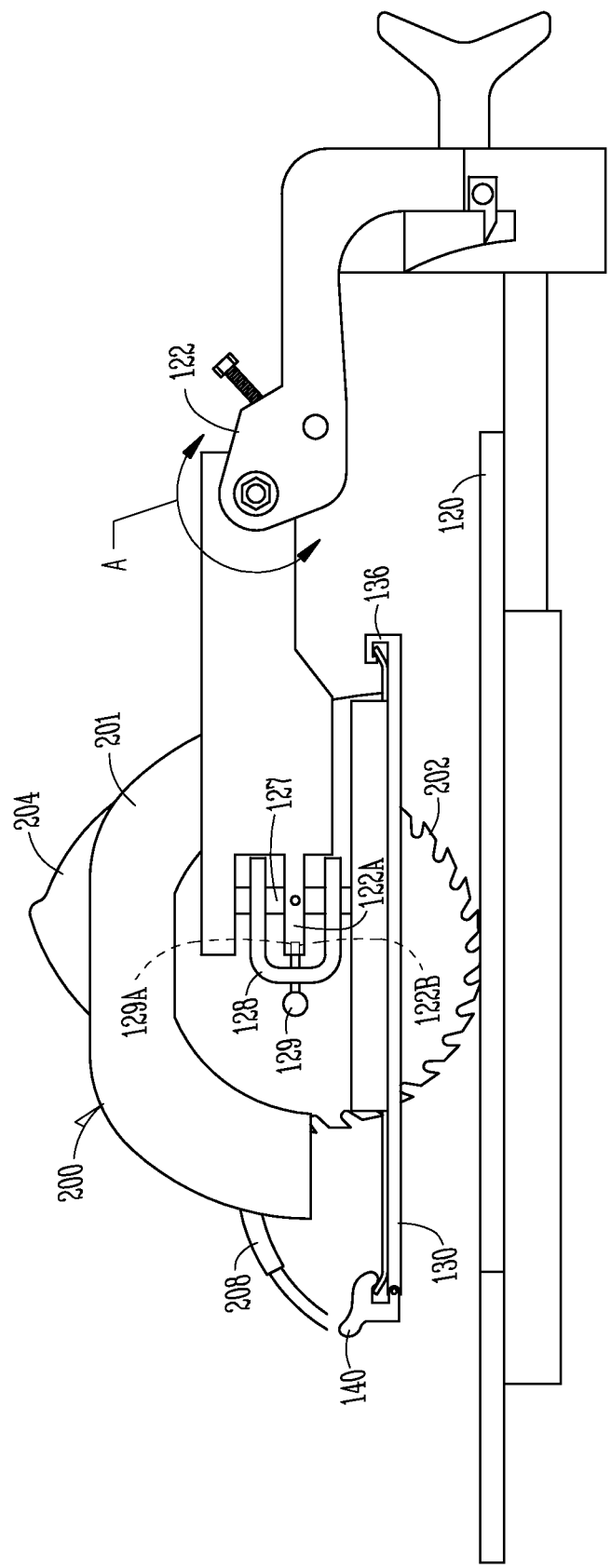
FIG. 6B is a right side view of a tool apparatus in accordance with at least one embodiment of the invention, a tool and a swivel of the tool apparatus being in a lowered position with respect to a base of the tool apparatus.

Referring now to FIGS. 5A and 5B, in some examples, an angle D between the saw blade 202 and the saw shoe 210 of the circular saw 200 is capable of being selectively adjusted. For instance, the saw blade 202 of the circular saw 200 is shown in FIG. 5A substantially perpendicular to the top of the table 120, in which the angle D is adjusted to substantially ninety degrees. In FIG. 5B, the saw blade 202 is adjusted such that the angle D is less than ninety degrees and the saw blade 202 is angled with respect to the top of the table 120. In this way, the circular saw 200 can be adjusted to perform angled cuts to the workpiece. In some examples, the angle of the saw blade 202 with respect to the top of the table 120 is solely adjusted by adjusting the angle D. In other examples, the angle of the saw blade 202 with respect to the top of the table 120 is adjusted by adjusting the angle D in conjunction with rotation of the arm 122 about the second arm axis Y (FIG. 4). In other examples, the angle of the saw blade 202 with respect to the top of the table 120 is solely adjusted by rotating of the arm 122 about the second arm axis Y (FIG. 4). Although FIG. 5B shows the saw blade 202 rotated in a clockwise direction from the position of the saw blade 202 in FIG. 5A, in some examples, it is contemplated that the saw blade 202 can be adjusted in a counterclockwise direction from the position of the saw blade 202 in FIG. 5A, either in addition to or instead of being adjustable in the clockwise direction. In some examples, the angle D of the saw blade 202 with respect to the saw shoe 210 and the angle of the saw blade 202 with respect to the fence 121 can both be adjusted, for instance, to perform compound miter cuts in the workpiece.

Referring now to FIGS. 5A-6B, in some examples, with adjustment of the angle D from the position of the saw blade 202 in FIG. 5A (the angle D is substantially ninety degrees) to the position of the saw blade 202 in FIG. 5B (the angle D is less than ninety degrees), a tip 202A of the saw blade 202 lifts with respect to the top of the table 120. As such, depending upon the adjustment of angle D and, in turn, the amount the saw blade 202 lifts with respect to the top of the table 120, a distance can develop between the tip 202A of the saw blade 202 and the top of the table 120. In such a situation, if the tool apparatus 100 were to be used to cut the workpiece, the cut would not go completely through the workpiece. In some instances, such a partial cut of the workpiece could be desirable. However, in other instances, it is desirable to still obtain a full cut through the workpiece despite the angle D being adjusted so as to lift the tip 202A of the saw blade 202 from the top of the table 120. In some examples in which a full cut through the workpiece is desired, the tip 202A of the saw blade 202 can be selectively lowered to lessen or eliminate the distance between the tip 202A of the saw blade 202 and the top of the table 120. For instance, in some examples, a distance between the base plate 130 and the top of the table 120 can be adjusted to account for the distance varying between the tip 202A of the saw blade 202 and the top of the table 120 with different settings of the angle D. For instance, in some examples, a swivel 128 of the tool apparatus 100 is operatively coupled to the base plate 130 and is translationally adjustable, such that adjustment of the swivel 128 adjusts the distance between the base plate 130 and the top of the table 120 (or a height of the base plate 130), and, in turn, the distance between the tip 202A of the saw blade 202 and the top of the table 120. In some examples, the swivel 128 includes a pin 129 selectively engageable in various positions to adjust the height of the base plate 130. In some examples, the pin 129 includes a spring-actuated pin 129 biased in an engaged position. Although shown and described using the pin 129 to adjust the height of the base plate 130, in other examples, other adjustment devices can be used, such as, but not limited to, a set screw, a springless pin, a cam/follower arrangement, or the like. In some examples, the height of the base plate 130 can be adjusted with respect to the top of the table 120 using a vertical translation stage including a rack and pinion drive.

In some examples, the swivel 128 can include a first raised position (see FIGS. 5A and 6A) in which the height of the base plate 130 is sufficient to allow the tip 202A of the saw blade 202 to be at or below the top of the table 120 with the angle D adjusted to be substantially ninety degrees. In this position, the pin 129 (or an end 129A of the pin 129) can be engaged with a portion 122A of the arm 122 (on a top surface, in a channel, or in a hole of the portion 122A, for instance) (see FIG. 6A). In some examples, the swivel 128 can include a second lowered position (see FIGS. 5B and 6B) in which the height of the base plate 130 is sufficient to allow the tip 202A of the saw blade 202 to be at or below the top of the table 120 with the angle D adjusted to be less than ninety degrees. In this position, the pin 129 (or the end 129A of the pin 129) can be engaged with the portion 122A of the arm 122 (in a hole 122B of the portion 122A, for instance) (see FIG. 6B). In this way, the user can account for height differences of the tip 202A of the saw blade 202 with respect to the top of the table 120 so as to allow for a full cut (if desired) through the workpiece regardless of the adjustment of the angle D. In some examples, more than two adjustment positions are contemplated, for instance by including additional holes or pin engagement positions on the portion 122A of the arm 122 or elsewhere on the arm 122 to allow for adjustment of the base plate 130 to more than two heights with respect to the top of the table 120. In other examples, it is contemplated that the swivel 128 includes no translational adjustment, such that the height of the base plate 130 with respect to the top of the table 120 is effectively fixed.

In some examples, the table 120 includes the slot 123 having a width sufficient to accommodate adjustments to the angle D of the saw blade 202. That is, because adjustment of the angle D laterally displaces the tip 202A of the saw blade 202, the slot 123, in some examples, is sufficiently wide to accommodate passing of the saw blade 202 within the slot 123 without interference (for instance, rubbing) of the saw blade 202 with the slot 123. In some examples, the slot 123 includes an insert engageable with respect to the table 120. That is, the table 120 includes a receptacle or other structure configured to receive a slot assembly 123. In this way, the slot 123 can be removed and/or replaced with another slot assembly, for instance, if the slot assembly 123 becomes worn or damaged or, for instance, if another size or configuration of slot is desirable to be used with the tool apparatus 100.

Referring to FIGS. 2-4, in some examples, the arm 122 can include translational motion along the arrow C (for instance, via one or more extendable rods 122C coupling the arm 122 with the base 110) with respect to the table 120. In some examples, the one or more rods 122C allow the arm 122 and the circular saw 200 to move horizontally (along the arrow C) with respect to the table 120 (for instance, in a manner similar to a radial arm saw). In some examples, translation of the circular saw 200 along the arrow C allows the circular saw 200 to move in the direction of the cut. In some examples, the one or more rods 122C are mounted on roller bearings to allow the one or more rods 122C to extend or retract with respect to the table 120. In this way, the arm 122 and, in turn, the saw blade 202 of the circular saw 200 coupled to the base plate 130 can be translated with respect to the table 120 to allow for cutting of widths larger that a diameter of the saw blade 202. In some examples, by pulling on the handle 204 of the circular saw 200, a cross cut may be made on a workpiece. For instance, a workpiece with a width larger than the diameter of the saw blade 202 would only be able to be partially cut with the tool apparatus 100 in miter saw mode 102 and the arm 122 only including rotational motion about the first arm axis X along the arrow A. With such a configuration, the workpiece would then have to be flipped and aligned with the previous cut to finish the remainder of the cut or the workpiece could not be cut using the tool apparatus 100 in the miter saw mode 102. However, by providing translational motion of the arm 122 along the arrow C, the saw blade 202 can be rotated along the arrow A to begin the cut and then translated along the arrow C through the width of the workpiece to finish the cut. Such a configuration allows for increased flexibility in widths of workpieces that can effectively be cut with the tool apparatus 100 in the miter saw mode 102. In some examples, even if the tool apparatus 100 in the miter saw mode 102 proves difficult or is unable to cut a particular width of workpiece, the multifunctional tool apparatus 100 includes additional modes of operation in which such cuts may be more easily performed, giving the tool apparatus 100 increased flexibility than, for instance, a saw capable of performing only as a miter saw.

Referring to FIGS. 7-10, in some examples, the tool apparatus 100 in the second mode includes the circular saw 200 coupled to the base plate 130, the second mode including a table saw mode 104. In some examples, the circular saw 200 is coupled to the base plate 130 in the second position 130B (see FIG. 15B) with the tool apparatus 100 in the table saw mode 104. In some examples, the circular saw 200 can be coupled to the base plate 130 by placing the front of the saw shoe 210 within the lip 136 of the base plate 130 and rotating the circular saw 200 such that the back of the saw shoe 210 presses against the tongue 142 of the clamp 140 to actuate the clamp 140 (see FIG. 16A). Pressing against the tongue 142, in some examples, causes the clamp 140 to rotate toward and over the back of the saw shoe 210 to engage the circular saw 200 and couple the circular saw 200 to the base plate 130 (see FIG. 16B). With the circular saw 200 coupled to the base plate 130, the saw blade 202 at least partially extends through the slot 131 in the base plate 130. The slot 131 of the base plate 130, in at least some examples, is sized and shaped to allow the saw blade 202 to rotate without interference from the slot 131, such as, for instance, the saw blade 202 rubbing against the side of the slot 131.

In the table saw mode 104, in some examples, the arm 122 of the tool apparatus 100 is constrained from rotating about the first arm axis X, such that the arm 122 is substantially stationary with respect to the base 110. In some examples, the arm 122 is substantially fixed with respect to the table 120, such that the tip 202A of the blade 202 is located proximate the top of the table 120. The arm 122, in various examples, is constrained from rotating in different ways, such as, for instance, one or more of engaging a pin between the arm 122 and another portion the base 110 to inhibit rotation of the arm 122, tightening a set screw, or the like. In some examples, the table 120 includes a recess 124 to allow a portion (for instance, the tip 202A) of the blade 202 to be disposed below the top of the table 120. In this way, the tip 202A of the saw blade 202 can be disposed below a bottom side of a workpiece placed on the table 120 to allow for a complete cut through the workpiece. In some examples, the recess 124 allows the saw blade 202 to drop below the top of the table 120 to cut fully through the workpiece without the saw blade 202 cutting into the table 120. If only a partial cut through the workpiece is desired, the saw blade 202 may be raised with respect to the top of the table 120. In some examples, a height of the saw blade 202 with respect to the table 120 can be adjusted by adjusting the circular saw 200 itself, by adjusting the position of the swivel 128 in the manner described herein, or a combination of adjusting the circular saw 200 and the swivel 128.

Figure 13:
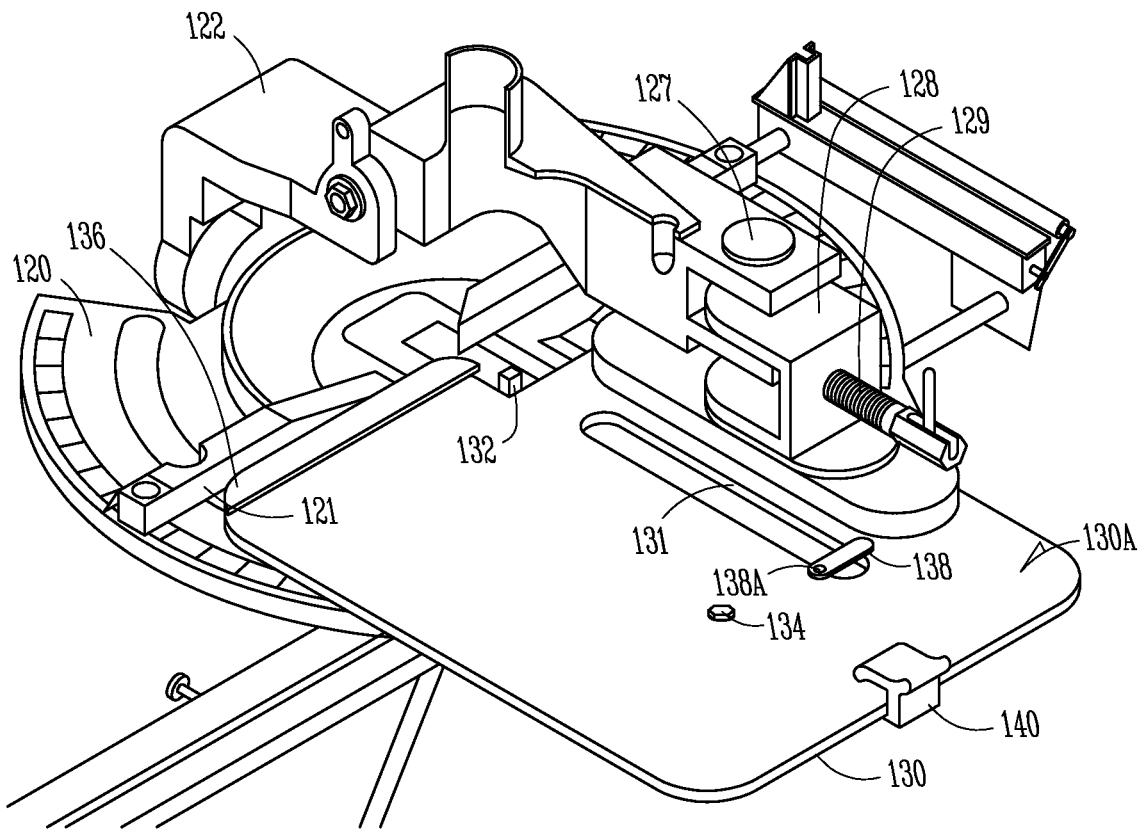
FIG. 13 is a back left side perspective view of a base plate of a tool apparatus in accordance with at least one embodiment of the invention, the base plate being in a first position.
Figure 14:
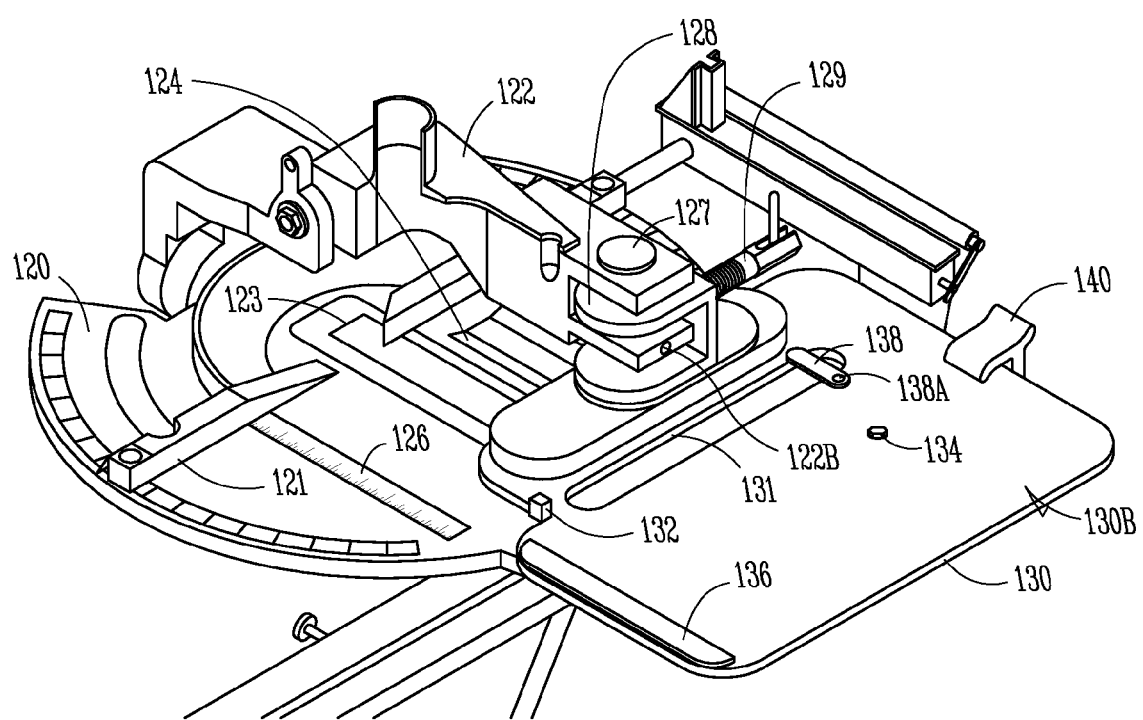
FIG. 14 is a back left side perspective view of a base plate of a tool apparatus in accordance with at least one embodiment of the invention, the base plate being in a second position.

Referring briefly to FIGS. 13-15B, the base plate 130 can be seen in the first position 130A (FIGS. 13 and 15A), for instance, for the miter saw mode 102, and in the second position 130B (FIGS. 14 and 15B), for instance, for the table saw mode 104. FIGS. 13 and 14 show the base plate 130 with the circular saw 200 removed from the base plate 130 in order to better see the swivel 128 in each of the first and second positions 130A, 130B of the base plate 130. In some examples, in order to configure the base plate 130 from the first position 130A to the second position 130B to configure the tool apparatus 100 in the table saw mode 104, the pin 129 can be disengaged from the portion 122A of the arm 122 to allow the swivel 128 and, in turn, the base plate 130, to rotate to the second position 130B. Once in the second position 130B, in some examples, the pin 129 can engage with the portion 122A of the arm 122 (for instance, within a hole, a channel, or the like) to retain the swivel 128 and the base plate 130 in the second position 130B. In some examples, the base plate 130 is rotated in a counterclockwise direction, when viewed from the top, to rotate the base plate 130 from the first position 130A to the second position 130B (see FIGS. 15A and 15B). In other examples, it is contemplated that the base plate 130 is rotated in a clockwise direction, when viewed from the top, to rotate the base plate 130 from the first position to the second position. In further examples, it is contemplated that the base plate 130 is rotated in either a clockwise direction or a counterclockwise direction, when viewed from the top, to rotate the base plate 130 from the first position 130A to the second position or a third position, respectively. Such an arrangement, in some examples, would allow the user to feed the workpiece into the tool apparatus 100 in the table saw mode 104 from either a left side or a right side, for instance, to better accommodate left-handed and right-handed users.

In some examples, the base plate 130 in the second position 130B can be oriented, such that the saw blade 202 of the circular saw 200, when engaged with the base plate 130, is oriented generally parallel to the fence 121. Such an arrangement allows for a workpiece to be placed against the fence 121 and fed toward the saw blade 202, such that the saw blade 202 cuts through the workpiece at a particular width (distance between the saw blade 202 and the fence 121) for a length corresponding to the amount of the workpiece passed through the tool apparatus 100 and in contact with the saw blade 202. In some examples, the entire length of the workpiece can be cut in this manner, for instance, to reduce a width of the entire workpiece from the previous width to a desired width. In other examples, a portion of the length of the workpiece can be cut in this manner, for instance, to cut a channel in the workpiece or to reduce a width or only a portion of the workpiece.

Referring again to FIGS. 7-10, the table 120, in some examples, can include a ruler 126, a scale, or other markings to facilitate setting a cutting width of the tool apparatus 100 in table saw mode 104. In some examples, the ruler 126 extends in a substantially perpendicular direction from the fence 121. In some examples, the ruler 126 includes a zero marking at the fence 121 and denotes increasing widths from the fence 121 to an end of the ruler 126. In this way, the user can use the ruler 126 to align the saw blade 202 at the desired width for cutting the workpiece. In some examples, the workpiece is pushed along the fence 121 in order to perform a rip cut of the workpiece with the tool apparatus 100 in the table saw mode 104. In some examples, the tool apparatus 100 includes a spring-loaded roller mounted to the fence 121 to help guide the workpiece with respect to the tool apparatus 100 or help hold the workpiece on the table 120. In some examples, the width of the cut can be adjusted, for instance, by moving the arm 122 along the arrow C (FIG. 7) by extending or retracting the one or more extendable rods 122C. The width of the cut can be locked using a set screw or other locking device associated with the one or more extendable rods 122C to inhibit the one or more extendable rods 122C from undesired extension or retraction and, thereby, altering the width of the cut.

In some examples, the tool apparatus 100 includes an alignment device 132 to facilitate aligning of the saw blade 202 with the intended line of cutting on the workpiece. In some examples, the alignment device 132 includes a laser 132. In other examples, other alignment devices are contemplated, such as, for instance a line (for instance, in the base plate 130 or the circular saw 200), a notch (for instance, in the base plate 130 or the circular saw 200), a light capable (other than a laser) of producing a discernible beam of light or otherwise producing a target line or area, or the like. In some examples, the laser 132 is disposed on the tool apparatus 100 in a location to accurately portray a line of cutting of the saw blade 202. In some examples, the laser 132 is configured to produce a laser line 133 along at least a portion of the table 120, such that the user can tell substantially where the saw blade 202 will cut with respect to the workpiece placed on the table 120. For instance, in the table saw mode 104, the laser 132, in some examples, is configured to produce a laser line 133 at least along the ruler 126 to inform the user of the cut width for the given configuration of the tool apparatus 100. With that in mind, the user can then adjust the cut width (for instance, by moving the arm 122 by retracting or extending the one or more extendable rods 122C along the arrow C) to achieve a desired cut width for the particular workpiece. In some examples, the laser 132 is disposed on the base plate 130, such that the laser line 133 portrays substantially the cut line of the saw blade 202 with the circular saw 200 coupled to the base plate 130. In other examples, it is noted that the laser can be disposed on other portions of the tool apparatus 100, provided that the laser line produced by the laser is capable of substantially portraying the cut line. For instance, the laser, in other examples, can be disposed on the circular saw or the arm, to name a few. It is further noted that, although the laser 132 and laser line 133 are described in the context of the table saw mode 104, it is contemplated that the laser 132 can be used in other modes, such as, but not limited to, the miter saw mode 102, for instance, to portray a cut line across the workpiece at ninety degrees to the fence 121 for cross cuts or at angles other than ninety degrees to the fence 121 for miter cuts. In further examples, one or more additional rulers can be disposed on the table 120 (or any other portion of the tool apparatus 100) to use with the laser line 133 in order to portray to the user the angle of the cut with respect to the fence 121, for instance.

In some examples, it is desirable to keep the tool apparatus 100 running (that is, maintain the saw blade 202 rotating) when in the table saw mode 104. For instance, when ripping a workpiece, it is often beneficial for the user to use both hands to feed the workpiece through the tool apparatus 100 to allow cutting of the workpiece with the saw blade 202. Because of this, it would be difficult for the user to also use a hand to push and hold the trigger 205 to cause rotation of the saw blade 202 during cutting of the workpiece. In some examples, the constant-on switch 206 can be used to maintain the circular saw 200 running with the saw blade 202 to allow the user to feed the workpiece through the tool apparatus 100 with both hands, for instance, to rip the workpiece. As described herein, the constant-on switch 206 can include a shield 207 in some examples, for instance, to inhibit accidental actuation of the constant-on switch 206. In some examples, the shield 207 is hinged to the housing 201 to allow the user to selectively open the shield 207 in order to actuate the constant-on switch 206. The shield 207, in some examples, can protect against the constant-on switch 206 being accidently bumped (for instance, by an object that the circular saw 200 passes by, the ground, an object in a bag or other container that the circular saw 200 is in, a child, or the like).

In some examples, the constant-on switch 206 is configured to be operable with the circular saw 200 coupled to the base plate 130 and inoperable with the circular saw 200 detached from the base plate 130. Such a configuration can be accomplished in a number of ways. For instance, in some examples, the circular saw 200 and the base plate 130 can include mating electrical contacts which effectively close a circuit of the constant-on switch 206 to allow the constant-on switch 206 to be operable with the circular saw 200 coupled to the base plate 130. In some examples, the electrical contacts of the circular saw 200 can be located in various locations on the saw shoe 210 in order to contact the electrical contacts of the base plate 130. For instance, the electrical contacts can be located at the front of the saw shoe 210 and the lip 136 of the base plate 130, at the back of the saw shoe 210 and the clamp 140, on the bottom of the saw shoe 210 and the top of the base plate 130, or a combination thereof. In other examples, the base plate 130 or the circular saw 200 can include a protrusion which corresponds to a receptacle of the other of the base plate 130 or the circular saw 200, wherein the protrusion fits within the receptacle with the circular saw 200 engaged with the base plate 130 to depress a button within the receptacle or otherwise close the circuit of the constant-on switch 206 to allow the constant-on switch 206 to be operable. It is noted that, although the constant-on switch 206 is described in the context of the table saw mode 104, it is contemplated that the constant-on switch 206 can be used in other modes, such as, but not limited to, the miter saw mode 102, for instance, to allow constant operation of the circular saw 200 while performing cross cuts and miter cuts.

In some examples, the constant-on switch 206 can be configured to operate only in the table saw mode 104. For instance, the constant-on switch 206 can be made operable only when the base plate 130 is in the second position 130B. In some examples, the constant-on switch 206 is interlocked such that the constant-on switch 206 is operable with the circular saw 200 coupled to the base plate 130 and the base plate 130 rotated in the second position 130B. In some examples, a protrusion mounted on the arm 122 can be used to activate an interlock switch located inside the housing 201 of the circular saw 200. For instance, a small hole in the housing 201 can be configured to accept the protrusion to actuate the interlock switch. In some examples, the interlock switch can include a mechanical detent or a switch in series with the constant-on switch 206. In other examples, the interlock switch can be electrically connected to the trigger 205 in order to change the trigger 205 from a momentary switch (when the interlock switch is not engaged) to an on-off switch (when the interlock switch is engaged). In other examples, the interlock switch can be located on the base plate 130 and acts to change the trigger 205 from a momentary switch when the circular saw 200 is disengaged from the base plate 130 to an on-off switch when the circular saw 200 is coupled to the base plate 130.

Figure 11:
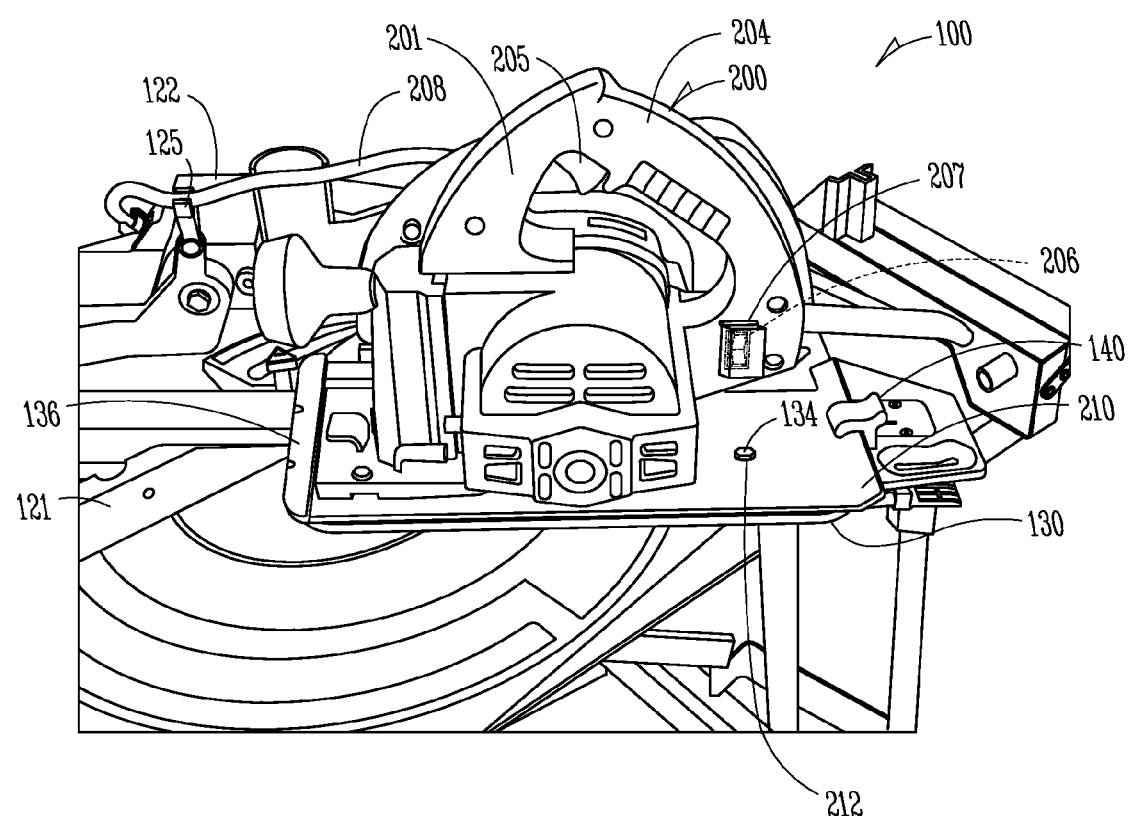
FIG. 11 is a back left side perspective view of a tool apparatus in accordance with at least one embodiment of the invention, the tool apparatus including a tool coupled with a base plate.
Figure 12:
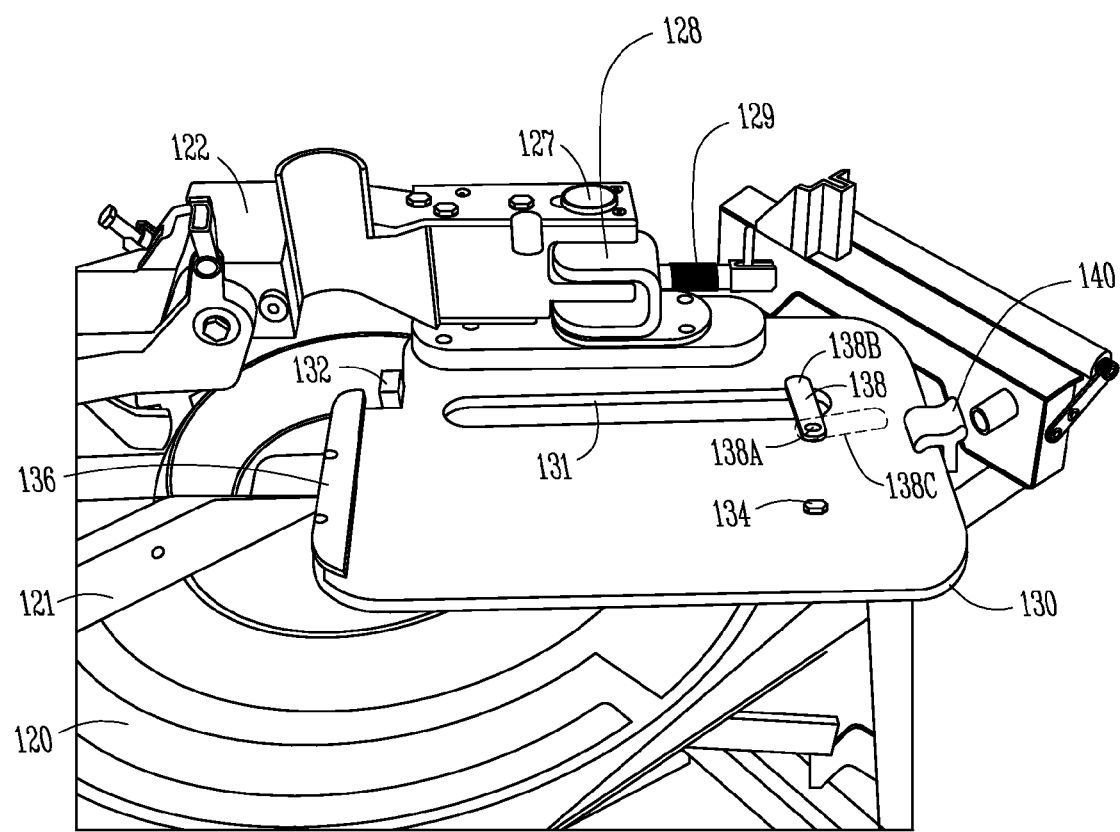
FIG. 12 is a back left side perspective view of a base plate of a tool apparatus in accordance with at least one embodiment of the invention.

Referring to FIGS. 11 and 12, in some examples, the base plate 130 includes an engagement feature 134, and the circular saw 200 includes a complementary engagement feature 212 configured to interact with the engagement feature 134 of the base plate 130 to inhibit rotation of the circular saw 200 with respect to the base plate 130 with the circular saw 200 coupled to the base plate 130 (for instance, during operation of the tool apparatus 100 in the miter saw mode 102 or the table saw mode 104). During operation, the circular saw 200 can experience forces which could tend to rotate, shift, or otherwise move the circular saw 200 with respect to the base plate 130. To guard against this, in some examples, the coupling of the engagement feature 134 of the base plate 130 with the complementary engagement feature 212 of the circular saw 200 substantially limits rotation, shifting, or other motion of the circular saw 200 with respect to the base plate 130. In some examples, the engagement feature 134 of the base plate 130 and the engagement feature 212 of the circular saw 200 are closely toleranced to allow for ease in mating the engagement features 134, 212 together with coupling of the circular saw 200 with the base plate 130 while at the same time substantially limiting motion of the engagement features 134, 212 with respect to each other (and, in turn substantially limiting motion of the circular saw 200 with respect to the base plate 130).

In some examples, the engagement feature 134 of the base plate 130 includes a protrusion 134 and the engagement feature 212 of the circular saw 200 includes a hole 212 (for instance, in the saw shoe 210) corresponding to the size, shape, and location of the protrusion of the base plate 130. In some examples, the hole 212 extends through the saw shoe 210. In other examples, the hole does not extend fully through the saw shoe. In some examples, the protrusion 134 and the hole 212 are each circular in shape. In other examples, the protrusion and the hole are both square-shaped, rectangle-shaped, diamond-shaped, triangle-shaped, oval-shaped, star-shaped, or the like. In some examples, the engagement feature of the base plate includes a hole and the engagement feature of the circular saw includes a protrusion. In some examples, the engagement feature of the base plate includes one or more walls configured to interact or abut with one or more sides of the saw shoe of the circular saw.

Referring to FIGS. 12-14, 17A, and 17B, the tool apparatus 100 includes a blade guard lock 138 configured to inhibit a blade guard 203 of the circular saw 200 from covering the saw blade 202 of the circular saw 200 with the circular saw 200 coupled to the base plate 130 (for instance, with the tool apparatus 100 in the miter saw mode 102 or in the table saw mode 104). In some examples, the slot 131 of the base plate 130 is sized to allow the blade guard 203 to move through the slit 131 so as to allow the blade guard 203 to cover some or all of the saw blade 202 with the circular saw 200 coupled to the base plate 130. However, in some operations, the user may desire to maintain the blade guard 203 in a retracted position to decrease or eliminate interference from the blade guard 203 on the operation or operations being performed. In some examples, the blade guard lock 138 is rotatable with respect to the base plate 130 about a pin 138A. The blade guard lock 138 can be rotated to a locked position 138B which partially covers the slot 131 to obstruct the blade guard 203 from covering the saw blade 202 or rotated to an unlocked position 138C to allow the blade guard 203 to pass through the slot 131 and cover some or all of the saw blade 202. In some examples, the blade guard lock is slidable with respect to the base plate to selectively cover part of the slot 131 to obstruct the blade guard 203 from covering the saw blade 202.

Referring to FIG. 16C, in some examples, the tool apparatus 100 in the third mode includes the circular saw 200 detached from the base plate 130, the third mode including a circular saw mode 106. In the circular saw mode 106, in some examples, the circular saw 200 can be freely guided by the user to cut a workpiece. In some examples, the user holds the circular saw 200 by the handle 204 and guides the circular saw 200 during cutting of the workpiece without attachment to the base plate 130 or any other portion of the base 110. In some examples, the circular saw mode 106 of the tool apparatus 100 can enable the user to cut workpieces in a manner which may not be able to be accomplished or would be more difficult to accomplish with the tool apparatus 100 in the miter saw mode 102 or the table saw mode 104. For instance, if the workpiece is too large to fit within the tool apparatus in the miter saw mode 102 or the table saw mode 104, such a workpiece might not be able to be cut as desired with the tool apparatus 100 in the miter saw mode 102 or the table saw mode 104, whereas such a workpiece may be able to be cut by the tool apparatus 100 in circular saw mode 106 due to the free guiding of the circular saw 200 by the user. As a further example of this, if the desired cut width of a workpiece exceeds the capabilities of the tool apparatus 100 in the table saw mode 104 (for instance, the desired cut width is too wide for the configuration of the arm 122 translated to a maximum cut width with respect to the fence 121), the circular saw 200 can be removed from the base plate 130 and the circular saw 200 can be used to freely cut the workpiece to the desired width. In other examples, a complex cut of a workpiece may prove difficult with the tool apparatus 100 in the miter saw mode 102 or the table saw mode 104 but can be more easily accomplished with the tool apparatus 100 in the circular saw mode 106 to allow the user to freely guide the circular saw 200. Such complex cuts can include a notch, a curved cut, or the like.

In some examples, the base plate 130 or the arm 122 includes an electrical connector configured to engage an electrical connector of the circular saw 200 with the circular saw 200 engaged with the base plate 130. In this way, power to the circular saw 200 can be routed through the connectors. In examples in which the circular saw is battery operated, the circular saw, when it is placed on the base plate, can be charged and the circular saw can receive power for operation from an external power source, such as, for instance, an electrical outlet.

In some examples, the tool apparatus can operate in either a corded mode or a cordless mode. When the tool apparatus is operated in the corded mode, the cord is plugged into an external power supply, such as an electrical outlet (which could be located on the base plate or it could be a standard electrical outlet) and the other end of the cord is plugged into a transformer. In some examples, the transformer can charge a battery and, at the same time, provide power to the circular saw in order to make it run. When the cord is unplugged from the tool apparatus, in some examples, the circular saw can operate using battery power. In this way, the tool apparatus can be used as a cordless saw (to allow the circular saw to be used when no nearby external electrical supply is required), for instance, when no external electrical power supply is available. The tool apparatus can also be used as a corded saw (the use of the saw is not limited by battery life), for instance, when an electrical supply is available.

In some examples, the tool apparatus includes the transformer located on the outlet side of the cord. In this way, the power exiting the transformer can be transmitted along the cord to the cordless circular saw and battery. In some examples, the transformer can be configured with a socket to accept an extra battery, for instance, for charging purposes. In this way, one battery can be charging in the transformer while another is in the circular saw. In some examples, the cordless circular saw can be lighter in weight because the circular saw does not include the transformer within the housing of the circular saw.

In some examples, with continued reference to FIGS. 1-17B and reference to the description herein, the present subject matter includes a method of making a multifunctional saw apparatus 100. In some examples, an arm 122 is movably attached to a base 110, the arm 122 being selectively rotatable about a first arm axis X. In some examples, a base plate 130 is pivotably engaged with the arm 122, the base plate 130 being pivotable with respect to the arm 122 between a first position 130A and a second position 130B. In some examples, a circular saw 200 is detachably coupled to the base plate 130, the circular saw 200 being movable with the base plate 130 when coupled to the base plate 130. In some examples, the multifunctional saw apparatus 100 includes a miter saw mode 102 with the circular saw 200 coupled to the base plate 130 in the first position 130A and the arm 122 being selectively rotatable about the first arm axis X. In some examples, the multifunctional saw apparatus 100 includes a table saw mode 104 with the circular saw 200 coupled to the base plate 130 in the second position 130B and the arm 122 being constrained from rotating about the first arm axis X, the arm 122 being substantially stationary with respect to the base 110. In some examples, the multifunctional saw apparatus 100 includes a circular saw mode 106 with the circular saw 200 detached from the base plate 130.

In some examples, the method includes forming a recess 124 in the base 110 to allow a portion of a blade 202 of the circular saw 200 to be recessed below a top surface of the base 110. In some examples, the recess 124 is formed in a top of a table 120. In some examples, the blade 202 of the circular saw 200 is recessed below the top surface of the base 110 in the table saw mode 104.

In some examples, a constant-on switch 206 is attached to the circular saw 200. In further examples, the constant-on switch 206 is operable with the circular saw 200 coupled to the base plate 130 and inoperable with the circular saw 200 detached from the base plate 130.

In some examples, with continued reference to FIGS. 1-17B and reference to the description herein, the present subject matter includes a method of using the multifunctional saw apparatus 100. In some examples, the multifunctional saw apparatus 100 can be used in the miter saw mode 102 with the circular saw 200 coupled to the base plate 130 in the first position 130A and the arm 122 being selectively rotatable about the first arm axis X. In some examples, the multifunctional saw apparatus 100 can be used the table saw mode 104 with the circular saw 200 coupled to the base plate 130 in the second position 130B and the arm 122 being constrained from rotating about the first arm axis X, the arm 122 being substantially stationary with respect to the base 110. In some examples, the multifunctional saw apparatus 100 can be used the circular saw mode 106 with the circular saw 200 detached from the base plate 130.

The present inventor has recognized various advantages of the subject matter described herein. For instance, the example tool apparatuses 100 described herein can be multifunctional in that the example tool apparatuses 100 can include more than one mode of use to allow for the example tool apparatuses to be used in different situations or to accomplish different tasks using the same tool apparatus. In this way, each of the example tool apparatuses 100 can effectively take the place of two or more separate tools. Because of this, a user need only carry, transport, or otherwise move and set up the tool apparatus 100 at a job site, rather than carrying two or more separate tools. In this way, the user can save time and energy in getting ready to perform tasks at a job site. Moreover, the user can save money by only buying the example tool apparatus 100, rather than two or more separate tools. While various advantages of the example tool apparatuses 100 are listed herein, this list is not considered to be complete, as further advantages may become apparent from the description and figures presented herein.

Although the subject matter of the present patent application has been described with reference to various embodiments, workers skilled in the art will recognize that changes can be made in form and detail without departing from the scope of the invention recited in the below claims.

The above Detailed Description includes references to the accompanying drawings, which form a part of the Detailed Description. The drawings show, by way of illustration, specific embodiments in which the present locator apparatus and methods can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "about" and "approximately" or similar are used to refer to an amount that is nearly, almost, or in the vicinity of being equal to a stated amount.

In the appended claims, the terms "including" and "in which" are used as the plain-English equivalents of the respective terms "comprising" and "wherein." Also, in the following claims, the terms "including" and "comprising" are open-ended, that is, an apparatus or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

The claimed invention is:

1. An apparatus comprising:
  a base including an arm selectively movable with respect to the base, the arm being selectively rotatable about a first arm axis at a first end of the arm, towards and away from a substantially planar top surface of the base;
  a base plate engaged with the arm at a second end of the arm, the base plate adapted to detachably couple to a saw having a saw blade, the saw being movable with the base plate when coupled to the base plate, wherein the apparatus is operable in different modes comprising:
    a first mode with the saw coupled to the base plate and the arm being selectively rotatable about the first arm axis;
    a second mode with the saw coupled to the base plate and the arm being constrained from rotating about the first arm axis, the arm being substantially stationary with respect to the base wherein the base plate is pivotable about a vertical axis such that a face of the saw blade is positionable to operate as a table saw; and
    a third mode with the saw being moveable horizontally along the base to operate as a radial saw.

2. The apparatus of claim 1, wherein the base plate is pivotably engaged with the arm, the base plate being pivotable with respect to the arm between a first position and a second position.

3. The apparatus of claim 1, wherein the first mode includes the base plate in the first position and the second mode includes the base plate in the second position.

4. The apparatus of claim 3, wherein the first position of the base plate is rotated substantially ninety degrees from the second position of the base plate.

5. The apparatus of claim 1, wherein the base plate includes a clamp configured to couple the saw to the base plate.

6. The apparatus of claim 1 wherein the saw comprises a circular saw.

7. The apparatus of claim 1 wherein the saw comprises a cordless saw.

8. The apparatus of claim 1, wherein the base includes a recess configured to allow a portion of the saw blade to be recessed below a top surface of the base.

9. The apparatus of claim 1 and further comprising a swivel coupled between the arm and the base plate, wherein the swivel is operable to adjust a height of the base plate from the base.

10. The apparatus of claim 9 wherein the swivel includes a pin to selectively engageable in various positions to adjust the height of the base plate.

11. An apparatus comprising:
  a base including an arm selectively movable with respect to the base, the arm being selectively rotatable about a first arm axis at a first end of the arm, towards and away from a substantially planar top surface of the base;
  a base plate pivotably engaged with the arm at a second end of the arm, the base plate being pivotable with respect to the arm between a first position and a second position, the base plate adapted to detachably couple to a circular saw having a saw blade, the circular saw being movable with the base plate when coupled to the base plate, wherein the apparatus is operable in different modes comprising:
    a miter saw mode with the circular saw coupled to the base plate in the first position and the arm being selectively rotatable about the first arm axis; and
    a table saw mode with the circular saw coupled to the base plate in the second position and the arm being constrained from rotating about the first arm axis, the arm being substantially stationary with respect to the base wherein the base plate is pivotable about a vertical axis such that a face of the saw blade is positionable to operate as a table saw.

12. The apparatus of claim 11, wherein the base includes a recess configured to allow a portion of a blade of the circular saw to be recessed below a top surface of the base.

13. The apparatus of claim 12, comprising a constant-on switch operable with the circular saw coupled to the base plate and inoperable with the circular saw detached from the base plate.

14. The apparatus of claim 12 and further comprising a swivel coupled between the arm and the base plate, wherein the swivel is operable to adjust a height of the base plate from the base.

15. The apparatus of claim 12 wherein the swivel includes a pin to selectively engageable in various positions to adjust the height of the base plate.

* * * * *